(12) United States Patent
Scalzo

(10) Patent No.: US 7,174,863 B2
(45) Date of Patent: Feb. 13, 2007

(54) MECHANISM FOR INTERNAL COMBUSTION PISTON ENGINES

(75) Inventor: Joseph Scalzo, Kew (AU)

(73) Assignee: Scalzo Automotive Research Pty Ltd, Victoria (AU)

( * ) Notice: Subject to any disclaimer, the term of this patent is extended or adjusted under 35 U.S.C. 154(b) by 0 days.

(21) Appl. No.: 10/541,223

(22) PCT Filed: Dec. 24, 2003

(86) PCT No.: PCT/AU03/01725

§ 371 (c)(1),
(2), (4) Date: Jul. 1, 2005

(87) PCT Pub. No.: WO2004/061270

PCT Pub. Date: Jul. 22, 2004

(65) Prior Publication Data

US 2006/0048728 A1    Mar. 9, 2006

(30) Foreign Application Priority Data

| Jan. 2, 2003 | (AU) | ............................ | 2003900003 |
| Jan. 22, 2003 | (AU) | ............................ | 2003900267 |
| Jan. 28, 2003 | (AU) | ............................ | 2003900349 |
| Jun. 16, 2003 | (AU) | ............................ | 2003903018 |
| Aug. 25, 2003 | (AU) | ............................ | 2003904582 |
| Nov. 3, 2003 | (AU) | ............................ | 2003906039 |
| Nov. 5, 2003 | (AU) | ............................ | 2003906092 |
| Nov. 11, 2003 | (AU) | ............................ | 2003906200 |

(51) Int. Cl.
*F02B 75/04* (2006.01)
*F02D 17/02* (2006.01)
*F02B 75/32* (2006.01)

(52) U.S. Cl. ................. 123/48 B; 123/78 F; 123/198 F

(58) Field of Classification Search ............ 123/198 F, 123/48 R, 48 B, 78 R, 78 BA, 78 E, 78 F
See application file for complete search history.

(56) References Cited

U.S. PATENT DOCUMENTS

| 4,270,495 A | 6/1981 | Freudenstein |
| 5,136,987 A | 8/1992 | Schechter et al. |
| 6,390,035 B2 | 5/2002 | Moteki et al. |

FOREIGN PATENT DOCUMENTS

| GB | 228706 A | 2/1925 |
| GB | 2312242 A | 10/1997 |

*Primary Examiner*—Noah P. Kamen
(74) *Attorney, Agent, or Firm*—Birch, Stewart, Kolasch & Birch, LLP

(57) ABSTRACT

A rocking mechanism through which linear reciprocating movement of a piston of an internal combustion engine can be transferred, from the remote end of a connecting rod on which the piston is mounted, to a crankshaft. The mechanism includes a rocking member; mountings by which the rocking member is mountable in relation to the crankcase for the engine, for reversible rocking movement on a first axis (X1); a link member pivotally connected at one end to the rocking member so as to be pivotable relative to the rocking member on a second axis (X2) between two extreme positions; and a holding device.

24 Claims, 21 Drawing Sheets

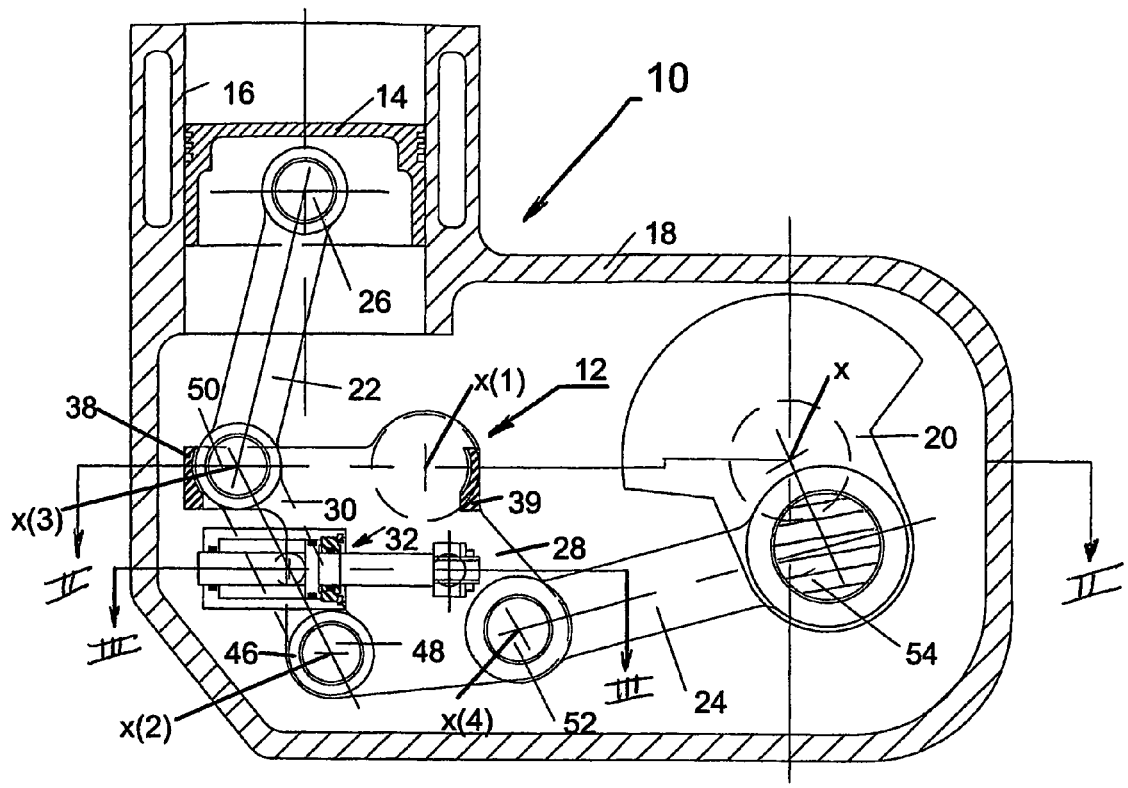
Figure 1
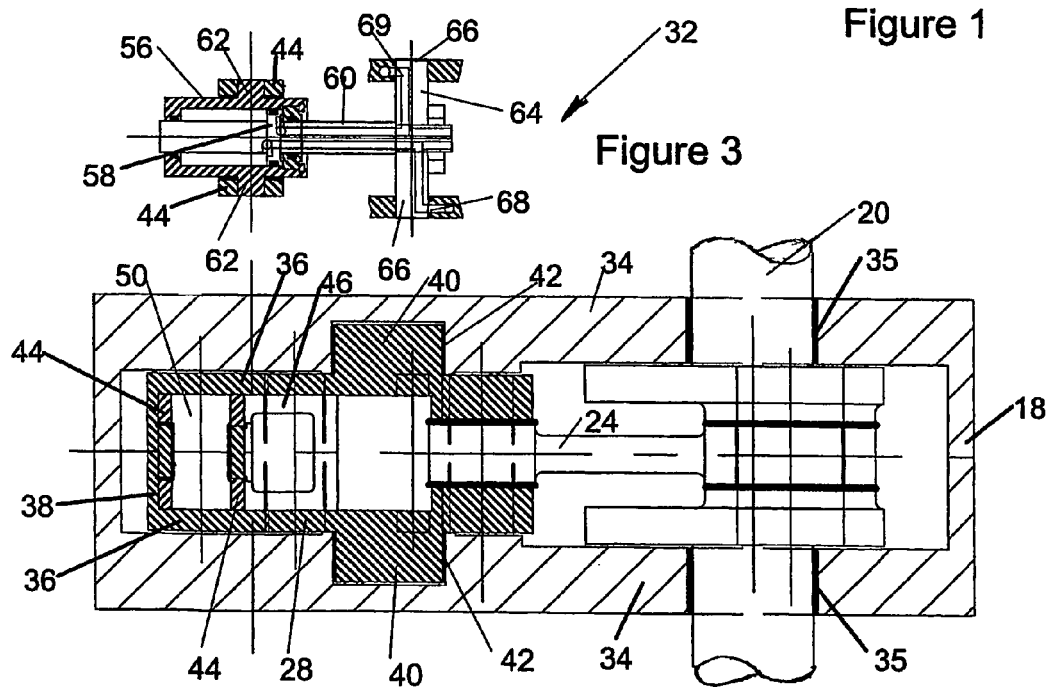
Figure 3
Figure 2

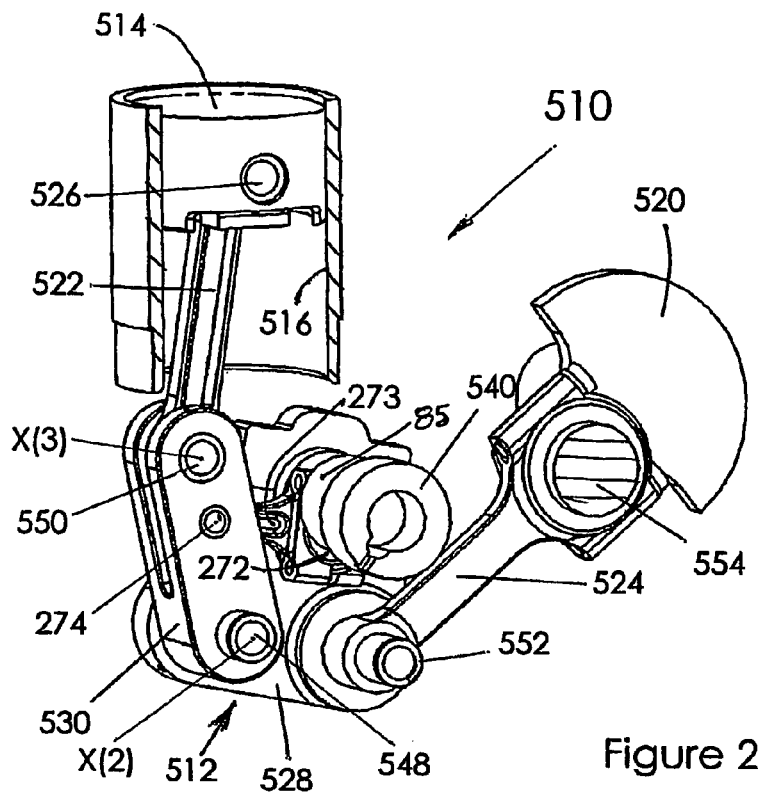
Figure 23
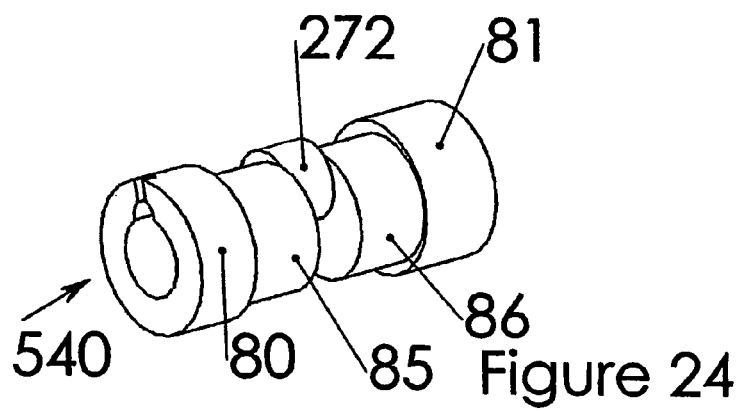
Figure 24
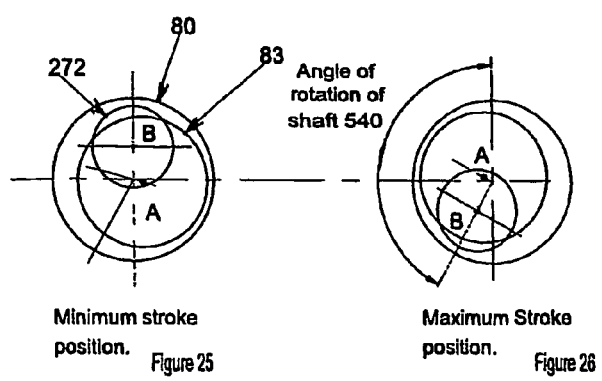
Minimum stroke position. Figure 25
Maximum Stroke position. Figure 26

MECHANISM FOR INTERNAL COMBUSTION PISTON ENGINES

CROSS-REFERENCE TO RELATED APPLICATION

The present application claims priority under 35 U.S.C. §119 to Australian Patent Application No. 2003900003, filed Jan. 2, 2003, (FILL IN OTHERS) the entire contents of which are hereby incorporated by reference.

BACKGROUND OF THE INVENTION

1. Field of the Invention

This invention relates to a rocking mechanism for a piston of an internal combustion (IC) engine. The invention also relates to an IC engine in which the motion of the piston of at least one of a plurality of cylinders is transferable by a said rocking mechanism to a crankshaft.

2. Description of Background Art

Conventional IC piston engines are made in a variety of cylinder configurations. For automotive engines, these include in-line, horizontally opposed and V-type configurations. Particularly with each automotive engine configurations, the engine is sized in volumetric capacity to enable a desired maximum speed and acceleration requirements. However the engine size generally means that at low load conditions, deceleration and braking periods, which together form a major part of the operating time for the engine, fuel consumption is high because the engine needs to be throttled and operates at a much reduced overall efficiency.

Many attempts have been made to reduce the capacity of an IC engine during low load conditions by variable stroke mechanisms and/or by cutting off fuel to some of the cylinders. However, most of these attempts have not been successful or effective. In the case of shutting off fuel to some of the cylinders, there has been some improvements but, because the piston of each of the cylinders to which fuel is shut off is still moving, maximum benefits have not been derived.

The present invention is directed to providing an improved rocking mechanism for an IC engine which, in an engine in which it is provided, is able to be adapted for variation in piston stroke and/or piston de-activation.

SUMMARY OF THE INVENTION

According to the present invention, there is provided a rocking mechanism through which linear reciprocating movement of a piston of an IC engine can be so transferred, from the remote end of a con rod on which the piston is mounted, to a crankshaft. The rocking mechanism includes:

a rocking member;

mountings by which the rocking member is mountable, on a structure of or secured to a crankcase for the engine, for reversible rocking movement on a first axis;

a link member pivotally connected, at one of opposite ends thereof, to the rocking member so as to be pivotable relative to the rocking member on a second axis, offset from and parallel to the first axis, between two extreme positions; and holding and adjusting means (hereafter referred to as "holding means") by which the link member is releasably holdable in either of the two extreme positions.

At its other end, the link member is adapted for pivotally connecting to the remote end of con rod so as to be pivotable relative to the con rod on a third axis which is offset from the second axis and parallel to the first and second axes. Also, at a location offset from the first axis, the rocking member is adapted for pivotally is connecting to a little end of a further con rod, having a big end connectable to the crankshaft, for relative rotation between the rocking member and the further con rod on a fourth axis parallel to the first, second and fourth axes.

The invention also provides an internal combustion engine having a cylinder head and a crankcase, a plurality of cylinders defined by the cylinder head, a crankshaft journalled in the crankcase for rotation on a longitudinal axis of rotation, a respective piston in each cylinder, and a respective con rod on one end of which each piston is mounted and from the remote end of which each piston is connected to the crankshaft for transferring linear reciprocation movement of each piston in its cylinder to, and for rotating, the crankshaft. The engine further includes, for at least one cylinder, a rocking mechanism through which the con rod (hereinafter referred to as the "first con rod"), on which the piston of the one cylinder is mounted, is connected to the crankshaft. The rocking mechanism includes:

a rocking member;

mountings by which the rocking member is mounted, on a structure of or secured to a crankcase for the engine, for reversible rocking movement on a first axis parallel to the crankshaft axis;

a link member pivotally connected, at one of opposite ends thereof, to the rocking member so as to be pivotable relative to the rocking member on a second axis, offset from and parallel to the first axis, between two extreme positions; and holding device by which the link member is releasably holdable in either of the two extreme positions.

The other end of the link member is pivotally connected to the remote end of the first con rod so as to be pivotable relative to the first con rod on a third axis offset from and parallel to the first and second axes. Also, the rocking member is pivotally connected to a little end of a second con rod having a big end journalled on the crankshaft, for relative rotation between the rocking member and the second con rod on a fourth axis parallel to the first, second and third axes. The first and second con rods are movable in the same plane or parallel planes and the first, second, third and fourth axes are parallel to the axis of rotation of the crankshaft. The arrangement is such that, with the holding device holding the link member, linear reciprocating motion of the piston of the one cylinder is able to be is transferred to the crankshaft and rotate the crankshaft, by the resultant motion of the first con rod being transferred to the second con rod by rocking motion of the rocking member on the first axis, by pivoting of the link member relative to the first con rod on the third axis, and by pivoting of the rocking member relative to the second con rod on the fourth axis.

The rocking mechanism of the present invention enables attainment of a number of significant practical benefits with an engine in which it is provided. One benefit is that it facilitates location of the crankshaft in a position laterally offset with respect to the lines along which the pistons are movable. By way of simple example, this is possible for an engine having an in-line cylinder configuration if 25 each piston is connected to the crankshaft by a respective rocking member. Alternatively, at least one piston may be connectable to the crankshaft through an alternative form of rocking mechanism. The alternative form of rocking mechanism may, for example, simply comprise a rocking member as required in the mechanism of the invention, with the rocking member directly pivotally so connected to the first con rod for the respective piston, rather than through a link member.

However, different embodiments of the rocking mechanism of the present invention enable further, more important benefits. These include:

(a) an engine adjustable for operation with either a maximum stroke setting or a minimum stroke setting;

(b) an engine adjustable for operation at any stroke setting from a maximum setting to a minimum setting;

(c) an engine able to operate as an Atkinson Cycle engine; and (d) an engine adjustable to enable piston de-activation.

In each case, the arrangement is possible with either an in-line, opposed or a V-type cylinder configuration. Also, in a variant on the V-type configuration, it is possible for each bank of cylinders to be parallel rather than in a mutually inclined V-shaped arrangement. In embodiments enabling piston de-activation, the invention enables engine immobilisation where each piston is able to be de-activated or stopped.

The form of the rocking member of the mechanism according to the present invention can vary substantially. One determinant of its form is the nature is of the holding device. In one arrangement, the holding device may be in the form of a device mountable on the rocking member. In that arrangement, the rocking mechanism may include a plate, with the first and second axes extending normal to and through the plate. In an alternative arrangement, the holding device may in part be defined by the rocking member and, in that alternative, the rocking 20 member may be in the form of a housing which has opposed, parallel side walls normal to and through which the first and second axes extend.

The mountings by which the rocking member is mountable in relation to the engine crankcase may comprise a pair of axle members or trunnions. Each of the axle members may extend from the rocking member in a respective direction 25 along the first axis. In that case, the axle members may be integral with or secured to the rocking member, with each journalled in a respective structure of, or secured to, the engine crankcase.

Alternatively, the mountings may comprise an opening or openings defined by the rocking member or by fittings secured to the rocking member. In that alternative, the or each opening may receive an axle or shaft or a respective axle or shaft extending from an adjacent structure of, or secured to, the engine crankcase.

A still further alternative is applicable where the pistons of successive cylinders are connected to the crankshaft by a respective rocking mechanism. In that further alternative, the mountings by which each rocking member is mounted may include an axle or shaft common to, and extending through, each rocking member. The mountings further include successive structures of, or secured to, the crankcase in which the axle or shaft is secured.

The link member usually is of elongate form and adapted for pivotable coupling at each end. While the link member may comprise a single elongate plate or bar, it preferably comprises a parallel pair of elongate plates or bars. More preferably, where the rocking member comprises a parallel pair of plates or bars, the link member may be forked in having the plates or bars form a parallel 10 pair of arms joined at the end of each arm at which the member is connectable to the rocking member at the second axis. The arms may be joined at those ends by a cylindrical web or boss by which the link member is able to be connected to the rocking member by a pin extending through the web or boss and the rocking member.

The holding device may be a device operable to hold the link member at or against a selected one of a respective stop defined at two extreme positions between which the link member is pivotable relative to the rocking member. The positions may be defined by the limits of movement of the holding device. However, the rocking member may have abutments or stops each for preventing 20 pivoting of the link member relative to the rocking member beyond a respective extreme position. In a further alternative, one extreme position may be defined by a limit of movement of the holding device, with the rocking member having an abutment or stop for preventing pivoting of the link member beyond the other extreme.

The holding device may be a device which is operable by a mechanical and/or fluid drive. In one convenient arrangement, the holding device is a double acting hydraulic ram which extends across or within the rocking member, laterally with respect to the link member. The ram may have one end pivotally connected to the rocking member and its other end pivotally connected to the link member, so preferably intermediate the second and third axes. Thus, the ram when coupled to a supply of pressurised hydraulic fluid, is able to extend or retract to pivot the link member relative to the rocking member, on the second axis.

In an alternative arrangement, the holding device comprises a holding arm which projects radially of the first axis, outwardly from the periphery of an eccentric on which the arm is journalled so as to be able to sweep arcuately. The end of the holding arm remote from the eccentric is pivotally connected to the link member, preferably intermediate the second and third axes. The eccentric is mounted on and rotatable with an adjusting shaft journalled in the rocking member laterally outwardly with respect to the link member, with its rotational axis coincident with the first axis. Rotation of the adjusting shaft causes the axis of the eccentric to orbit around the axis of the adjusting shaft, thereby causing the link member to pivot relative to the rocking member on the second axis, with the holding arm sweeping arcuately on the axis of the eccentric in adjusting relative to the link member.

Rotation of the adjusting shaft can be by any suitable mechanism. The shaft may, for example, carry a gear which forms part of a drive train operable, when required, to vary the position of the link member. In an alternative arrangement, the adjusting shaft forms part of a hydraulic actuator which includes a housing into which the shaft extends, with the shaft having a radial vane located in a chamber defined by the housing. Appropriate seals are provided between the vane and the housing such that, with the supply of hydraulic fluid to the chamber, to one side or the other of the vane, the vane is caused to sweep arcuately to rotate the adjusting shaft in one direction or the other.

The respective pivotable connections at the second axis of the rocking mechanism, and also at the third and fourth axes in an IC engine having the rocking mechanism, can be of any suitable form. The connection at the second axis may be provided by a pin which is secured to the rocking member and on which the link member is journalled. The same arrangement is possible at the 25 fourth axis in that the little end of the second con rod may be journalled on a pin secured to the rocking member. At the third axis, the pivotable connection may be provided by a pin extending through, and held captive by, the remote end of the first con rod and the link member.

As indicated above, the rocking member of the rocking mechanism is so adapted for pivotally connecting to the little end of a further or second con rod which has a big end connectable to the crank shaft. The rocking member is so adapted at a location offset from the first axis. However, apart from this latter constraint, there is substantial freedom in choosing the location. Indeed, the location even may be such that the second and fourth axes are co-incident. That is, while reference is made herein to first, second, third and fourth axes, the second and fourth axes may be a common axis for the respective pivoting of the link member and the second con rod relative to the rocking member. In such case, there preferably is a common pin at the common axis on which each of the 5 link member and second con rod is journalled.

It also is to be noted that while the respective connections at the second and fourth axes are described as spaced from the first axis, the connection at the third axis is indicated as simply being spaced from the second axis. The third axis generally is spaced from the first axis but, in some engine embodiments, it is 10 possible with pivoting of the link member for the third axis to become co-incident with the first axis. This is illustrated later herein with reference to some embodiments illustrated in the accompanying Figures, and applies in the case of a piston which is de-activated.

GENERAL DESCRIPTION OF THE DRAWINGS

In order that the invention may be more readily understood, description now is directed to the accompanying drawings, in which:

FIG. 1 is a vertical cross section through a piston/crank assembly of an engine according to a first end embodiment of the present invention;

FIG. 2 is a horizontal cross-section taken on line II—II of FIG. 1;

FIG. 3 is a horizontal cross-section taken on line III—III of FIG. 1;

Figure 4:
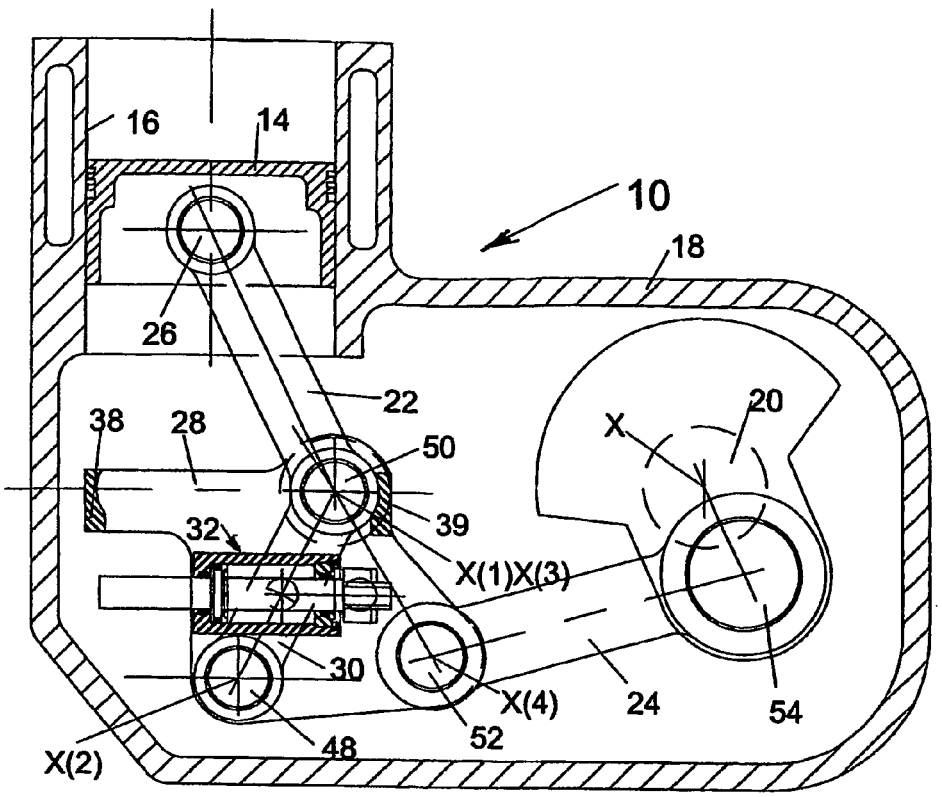
Figure 7:
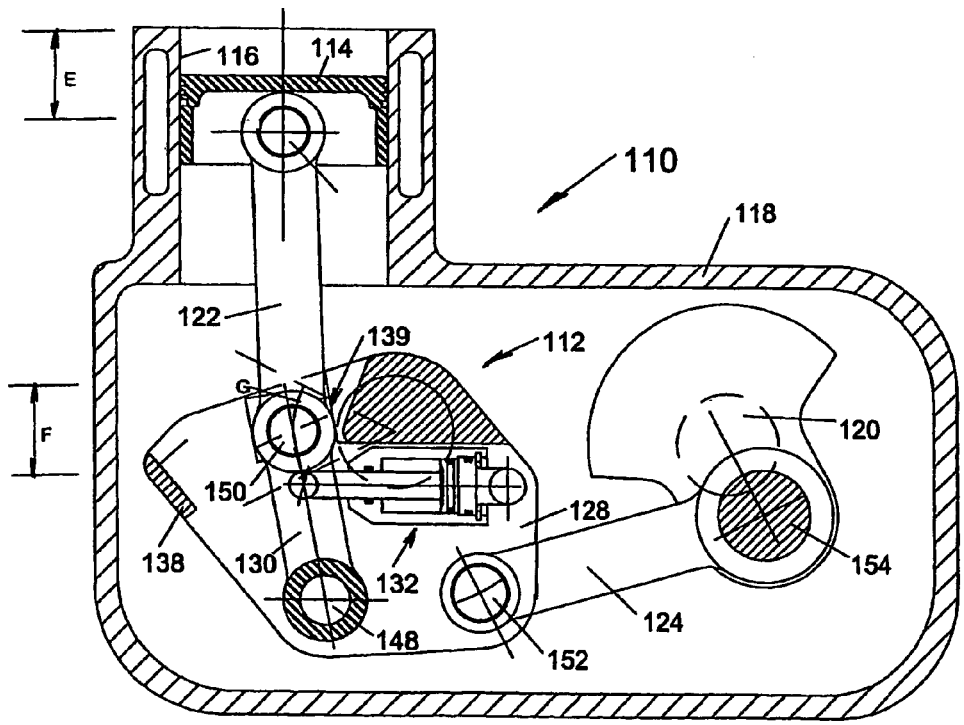
Figure 5:
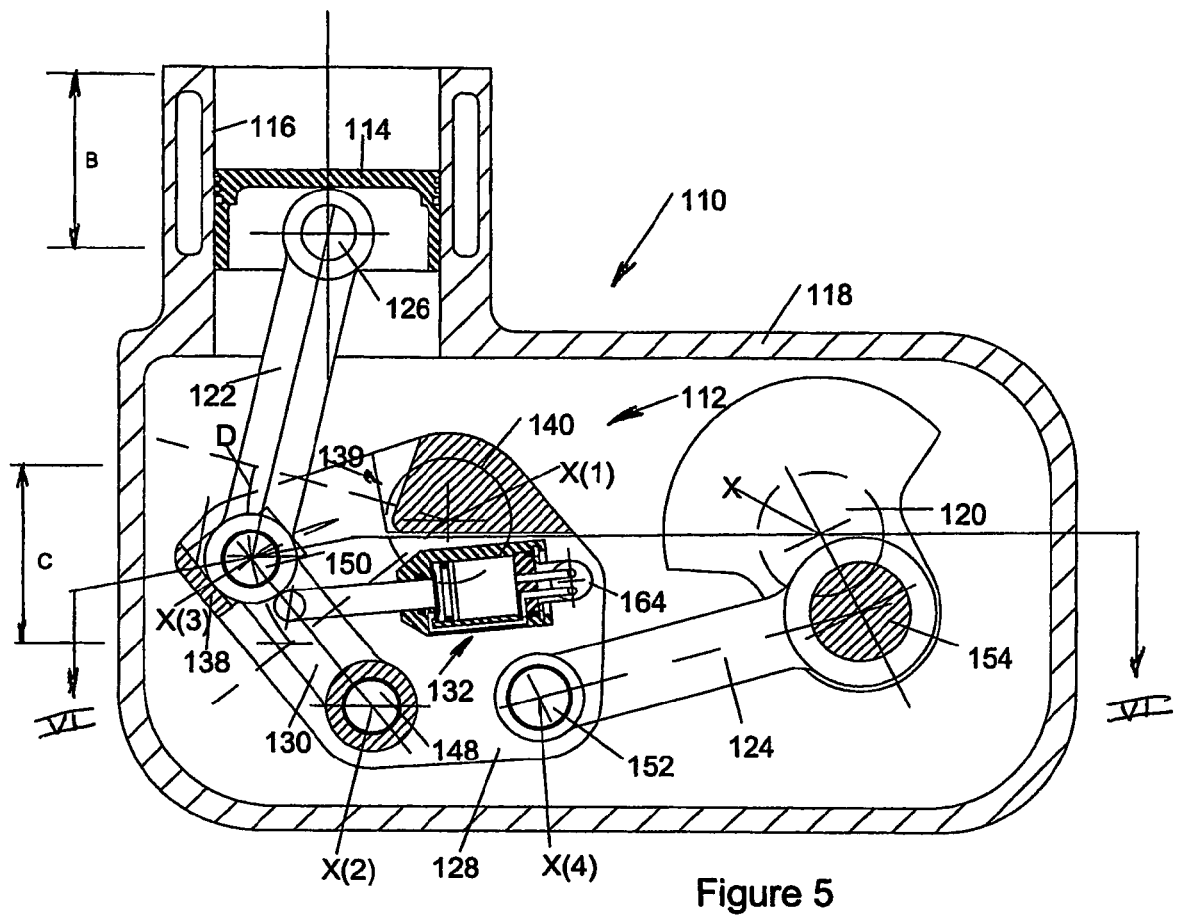
Figure 6:
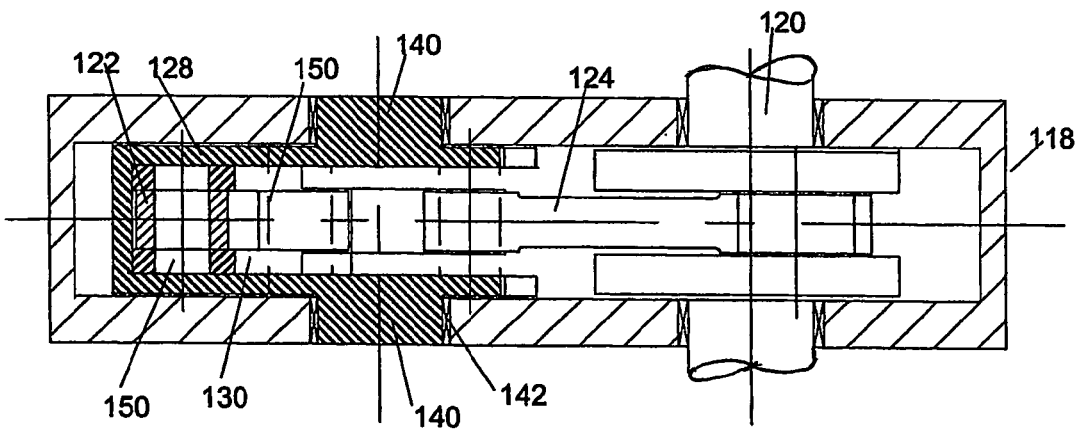
Figure 8:
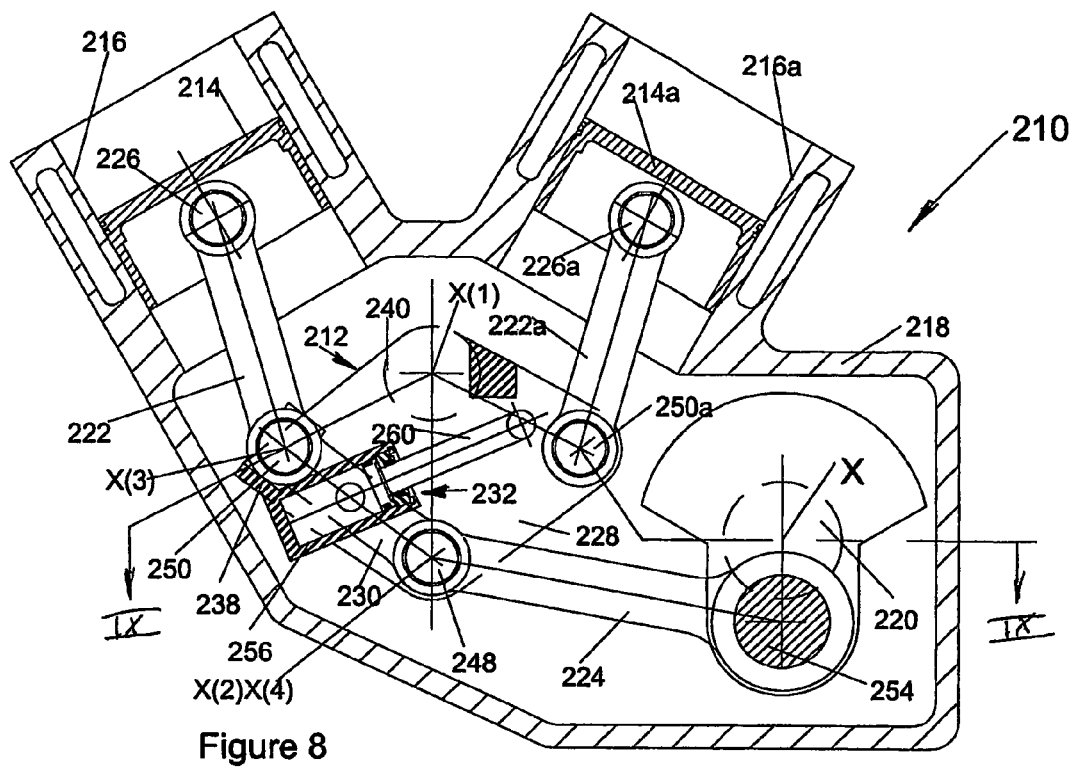
Figure 9:
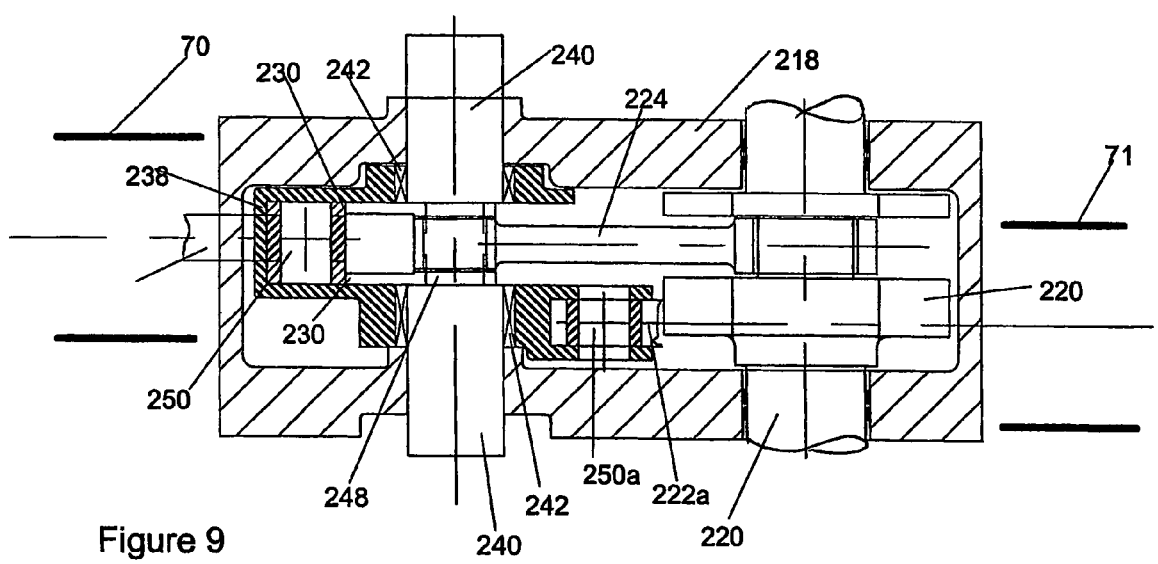
Figure 10:
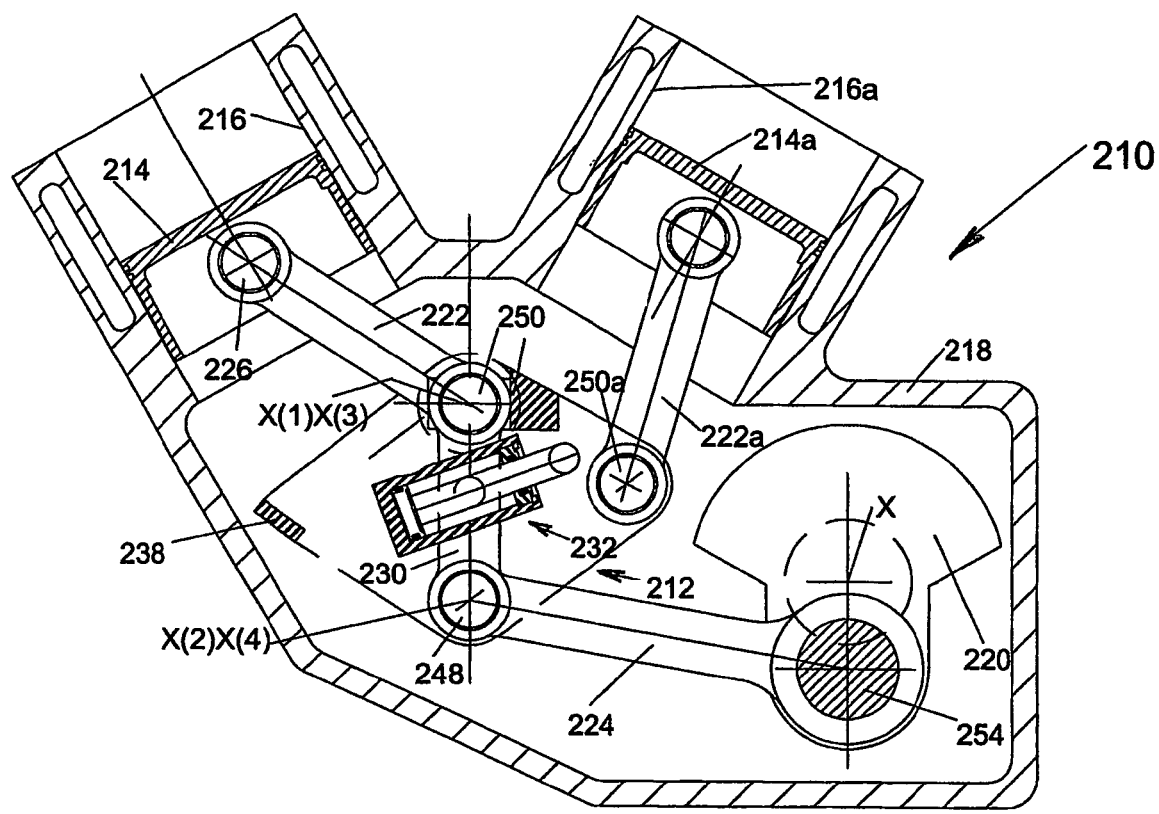
Figure 11:
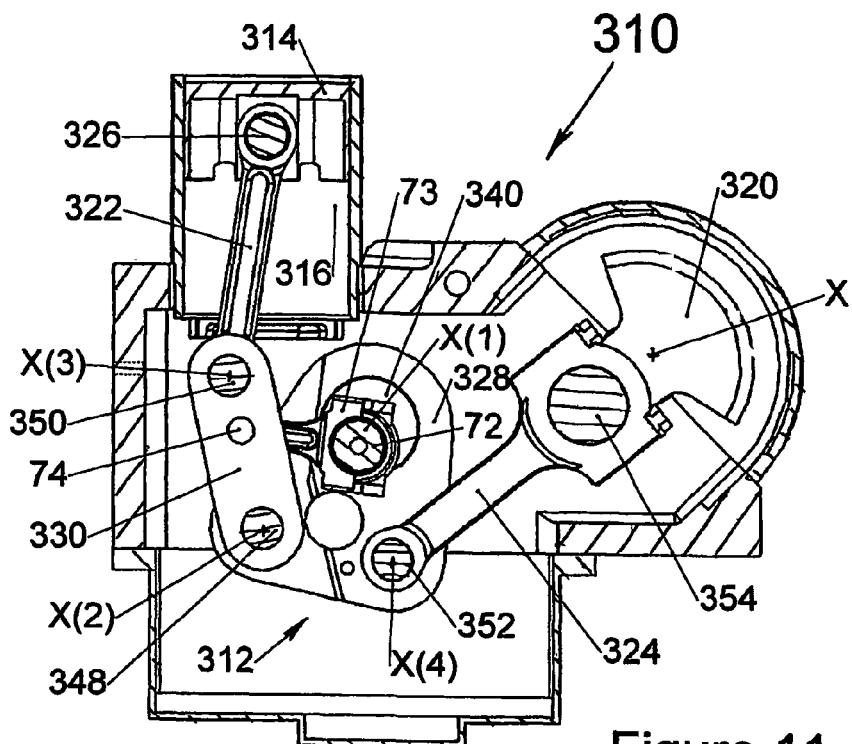
Figure 12:
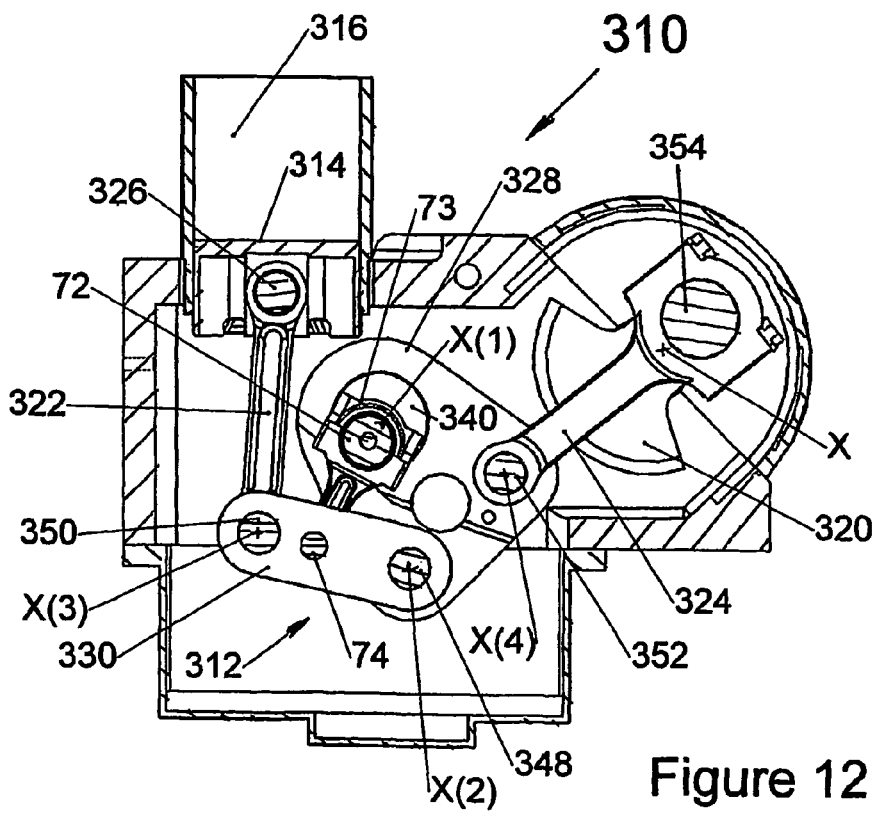
Figure 13:
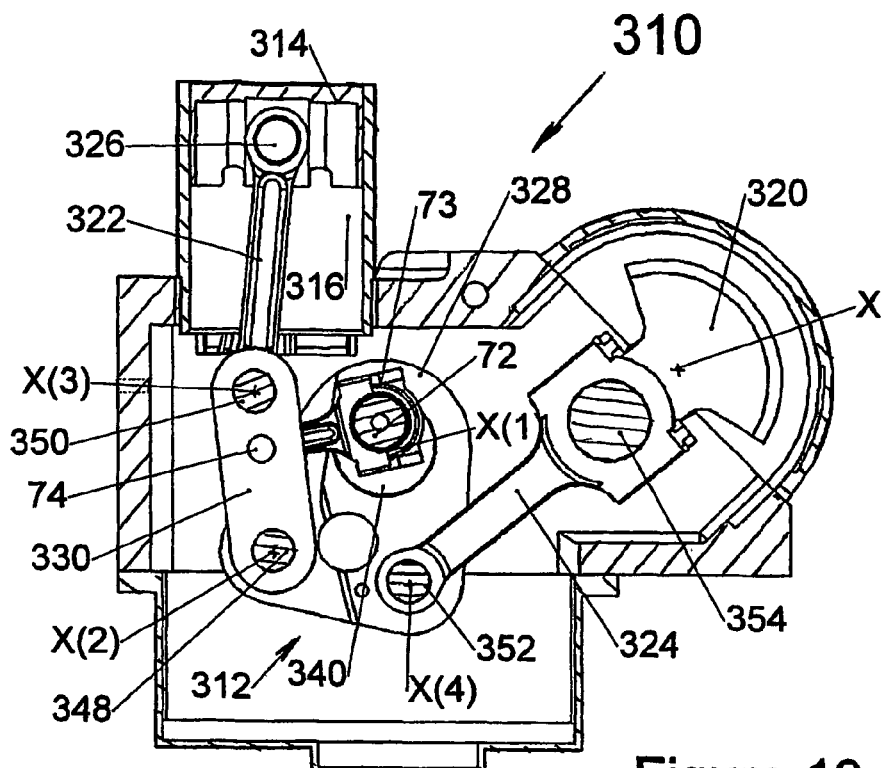
Figure 14:
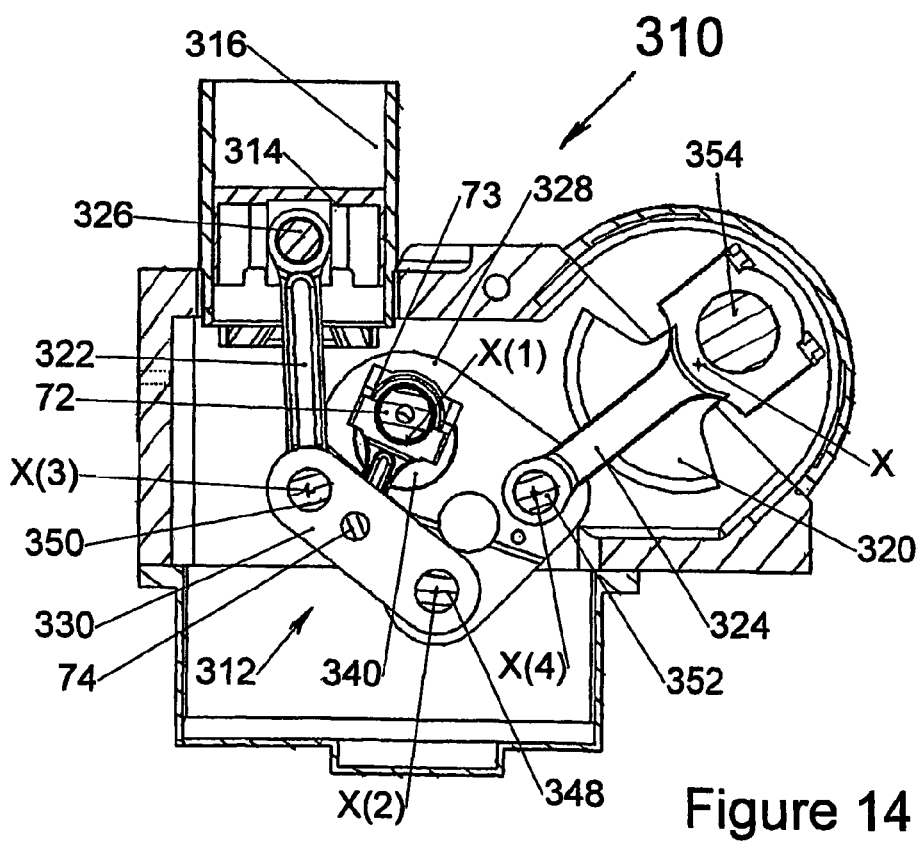
Figure 15:
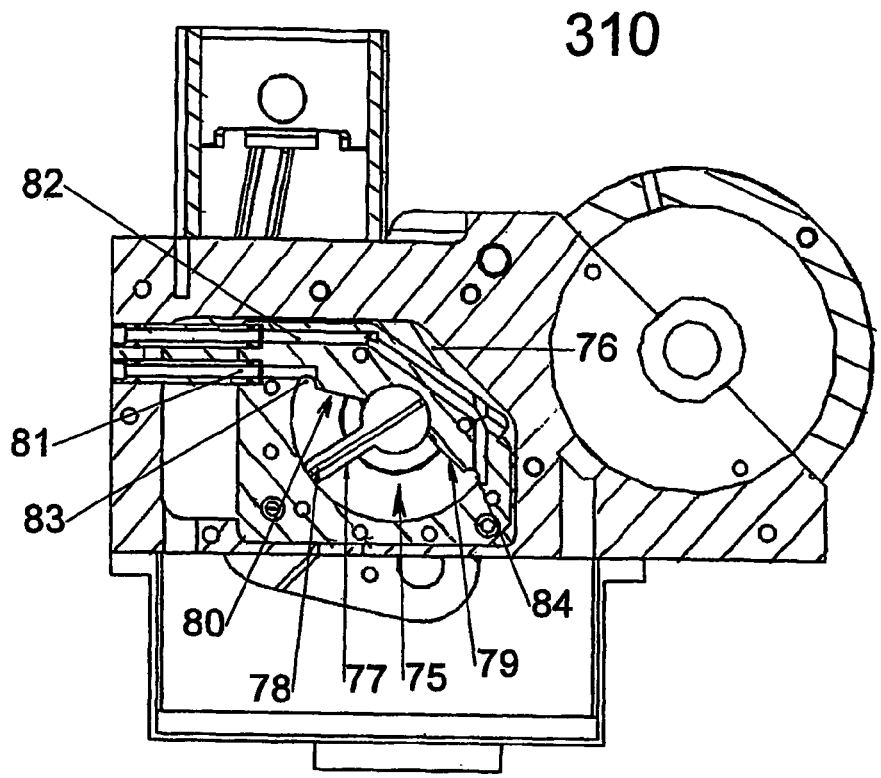
Figure 20:
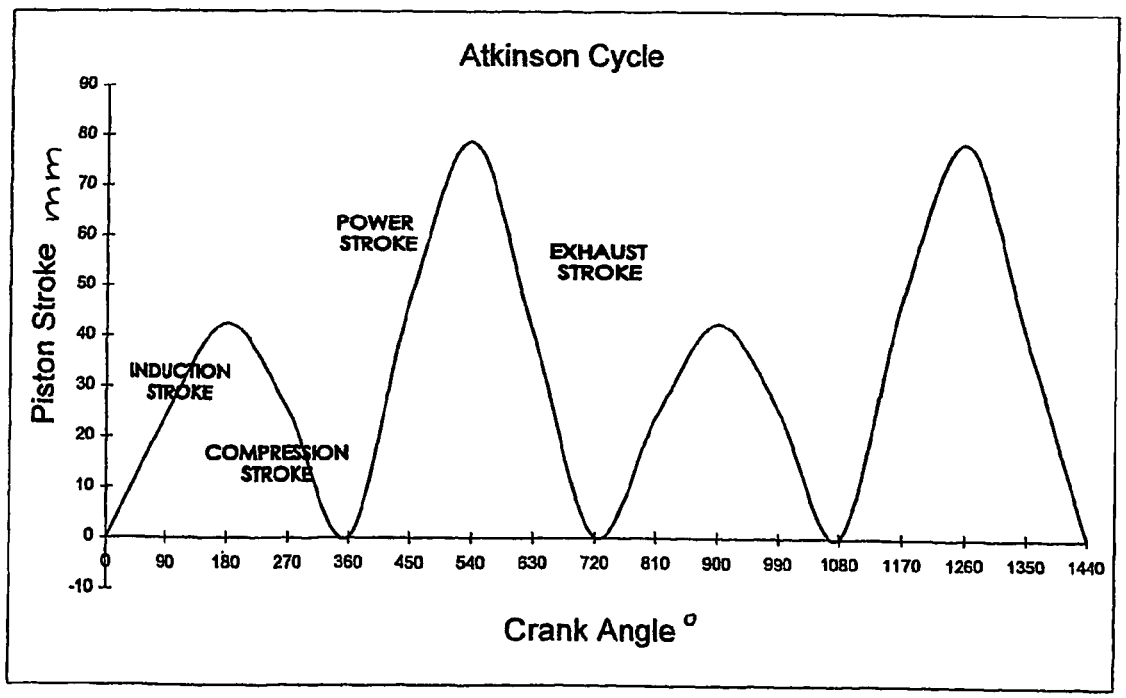
Figure 16:
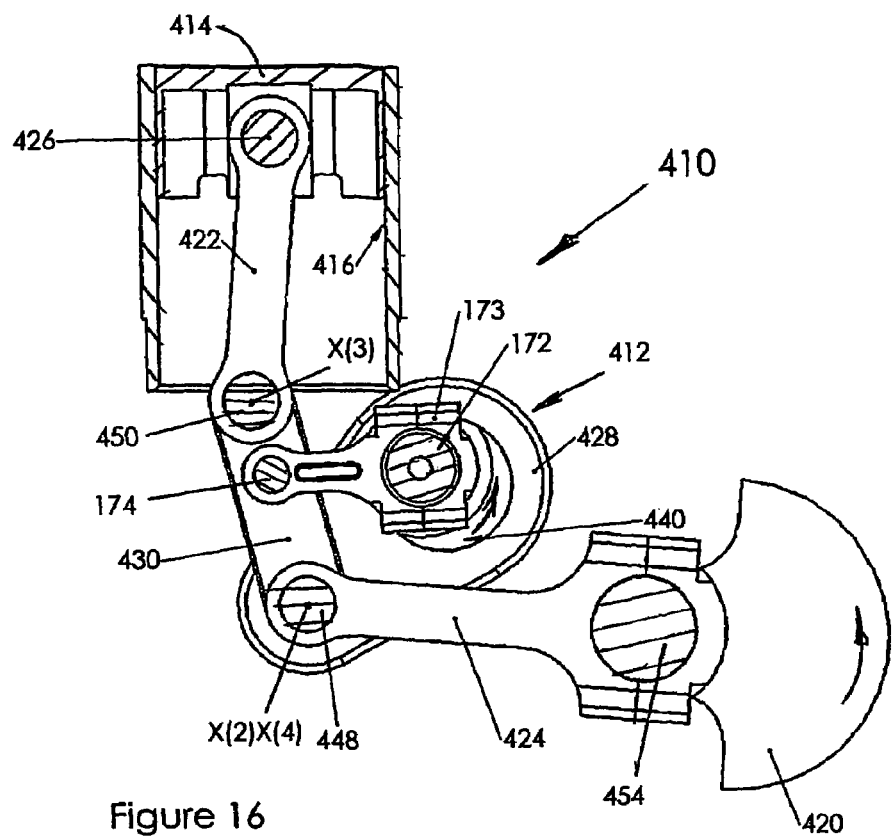
Figure 17:
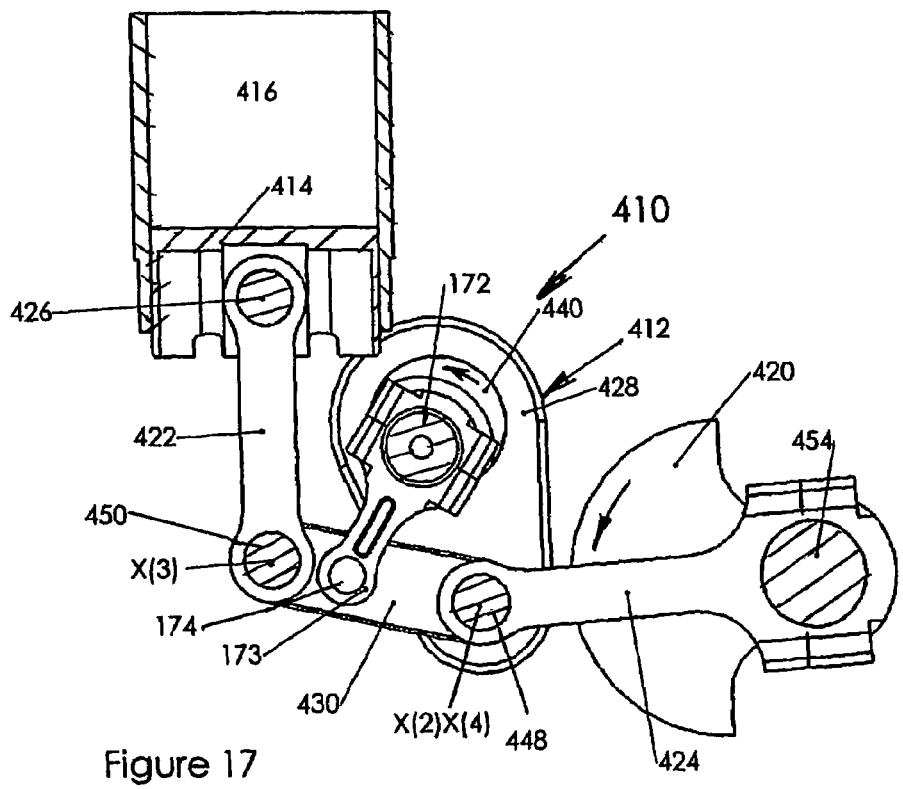
Figure 18:
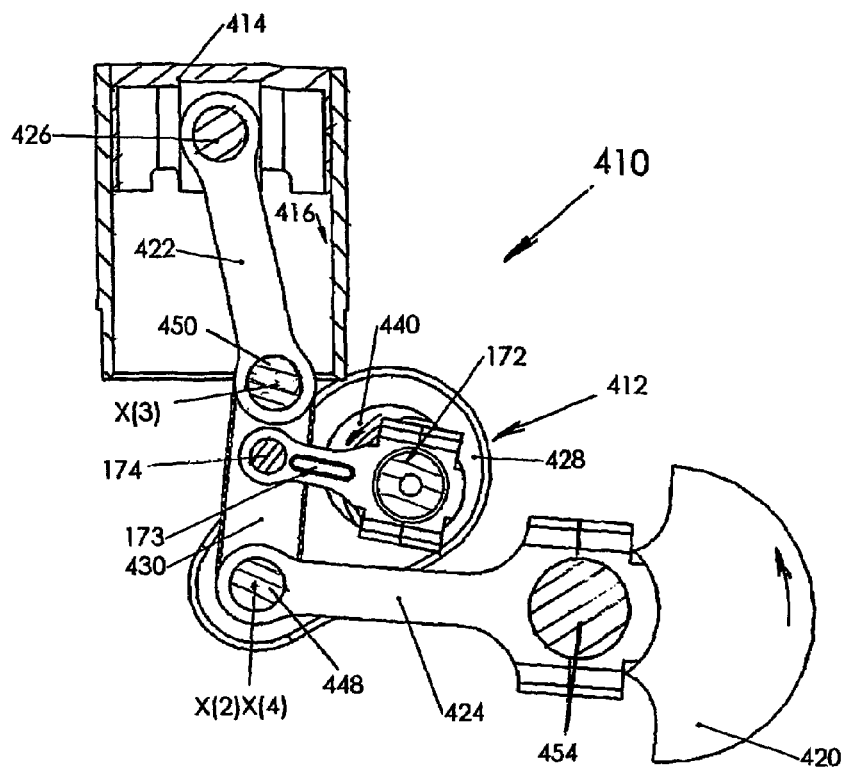
Figure 19:
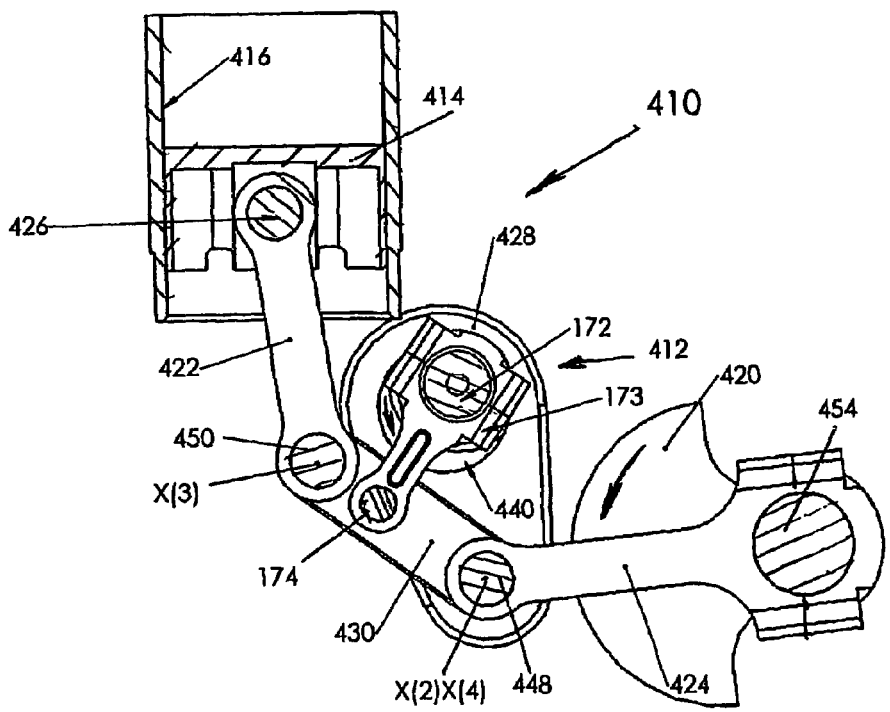
Figure 21:
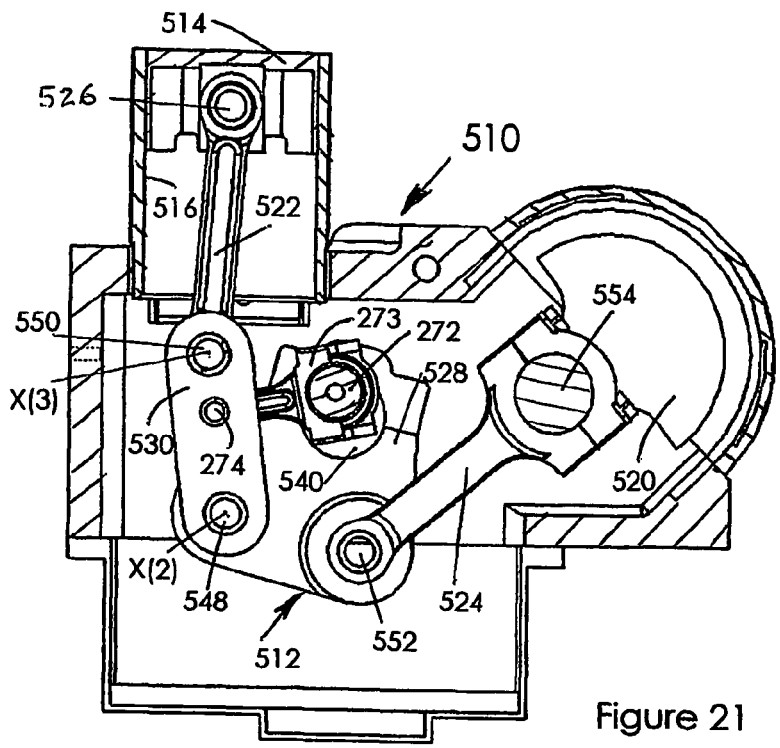
Figure 22:
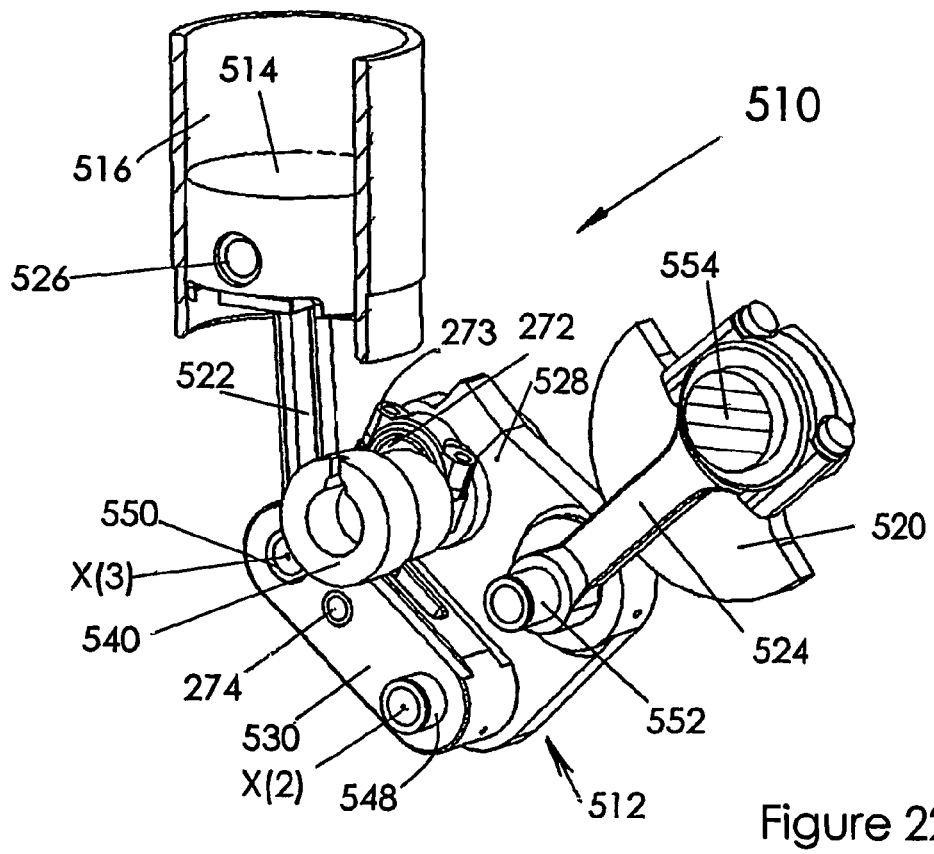
Figure 27:
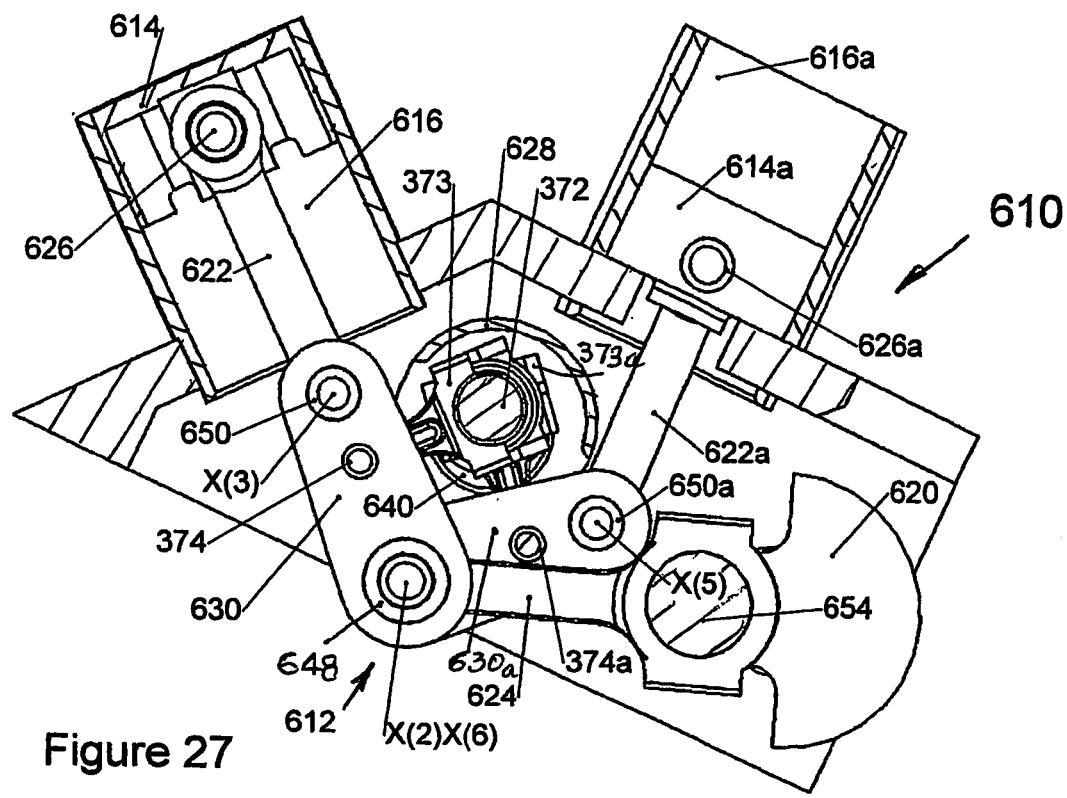
Figure 28:
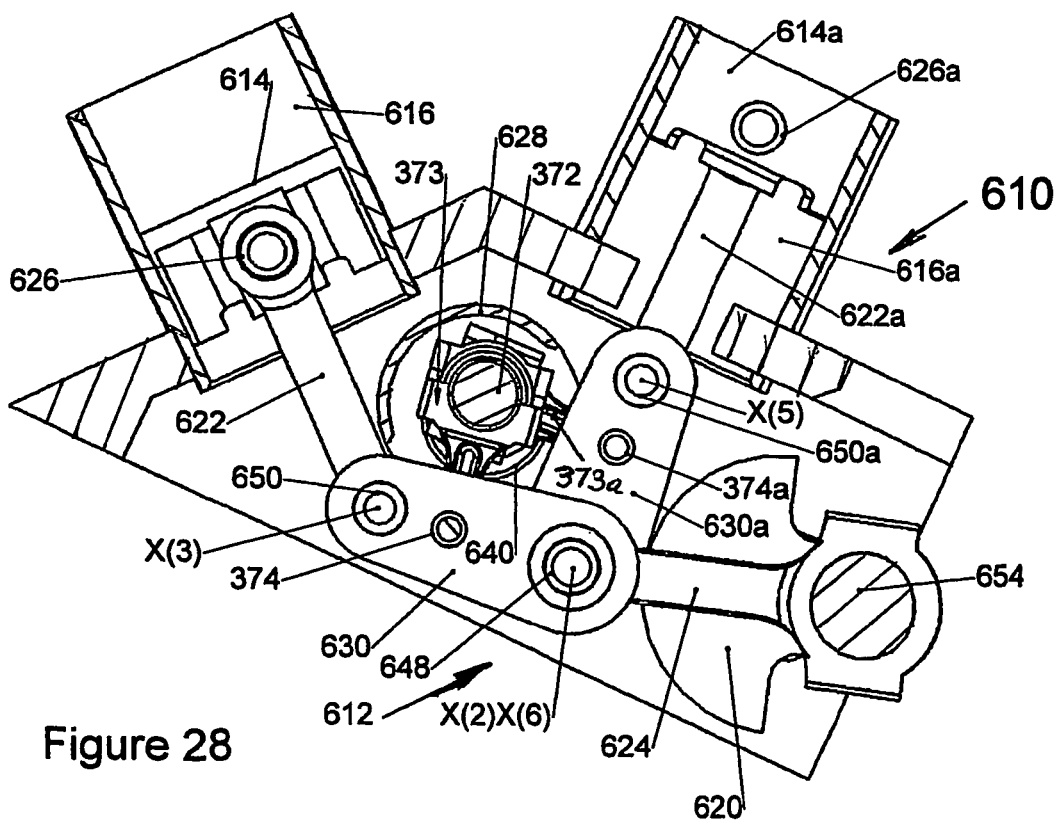
Figure 29:
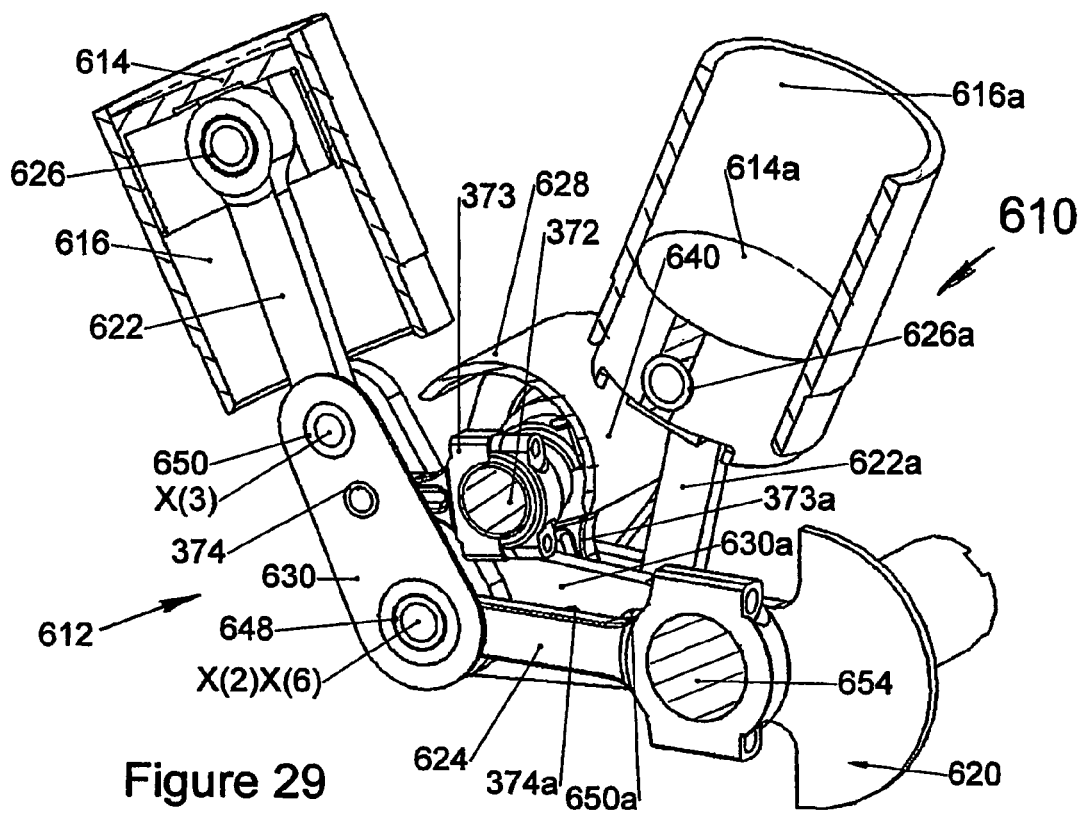
Figure 30:
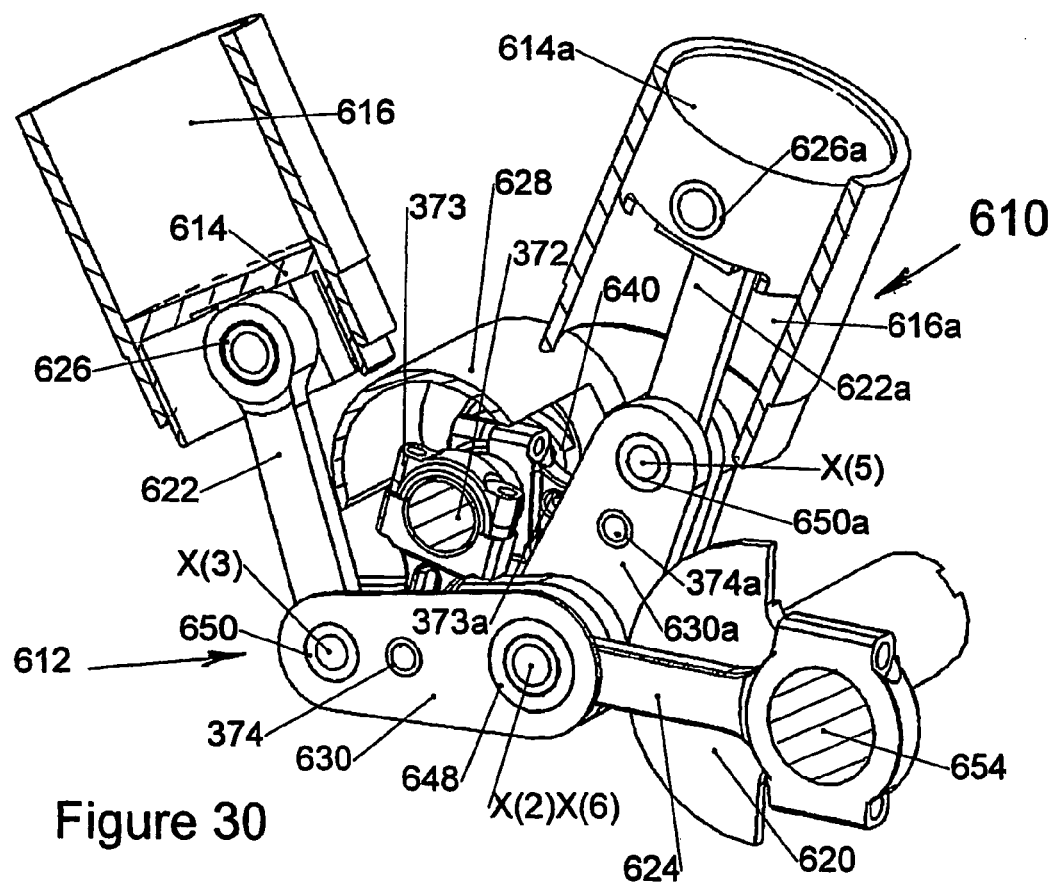
Figure 31:
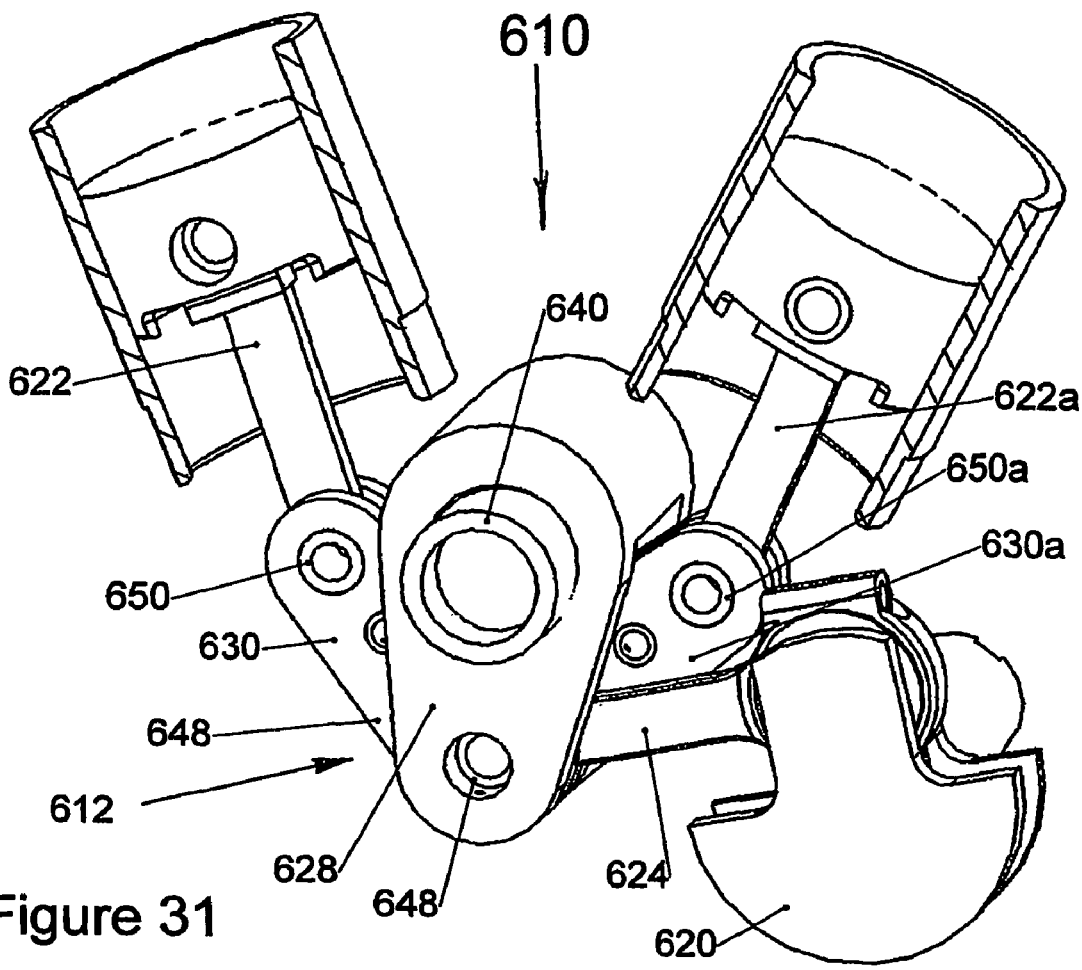
Figure 32:
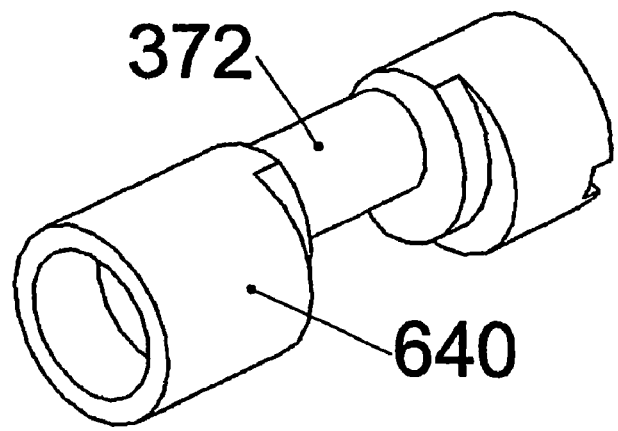
Figure 33:
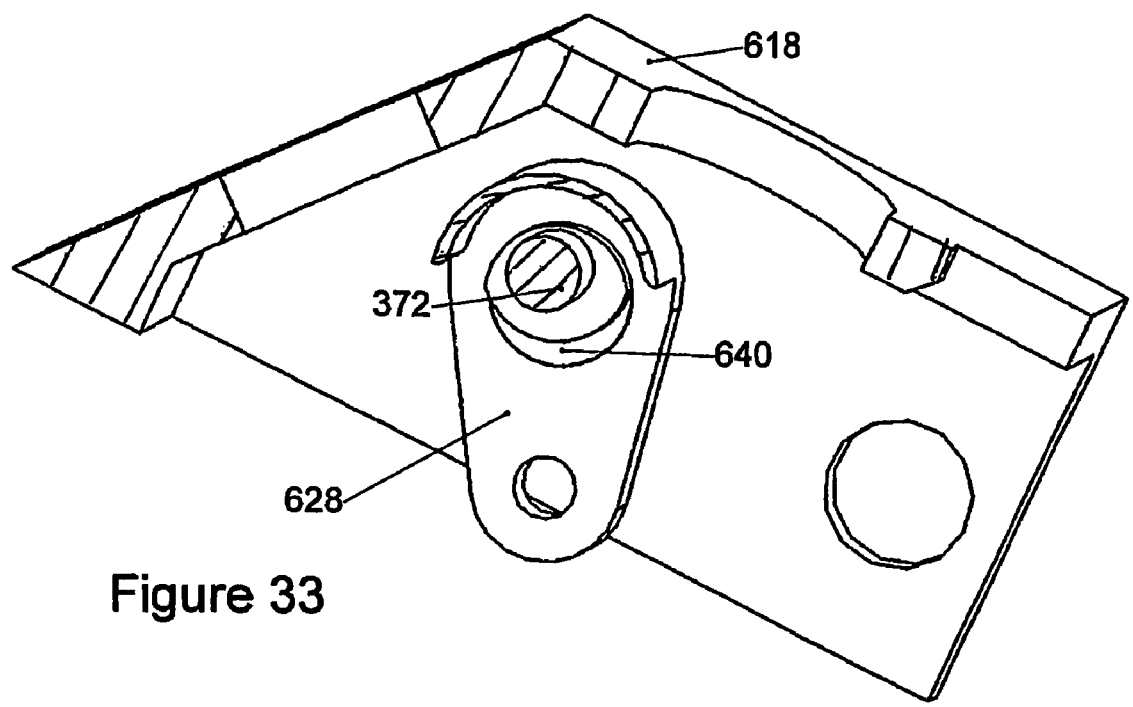
Figure 34:
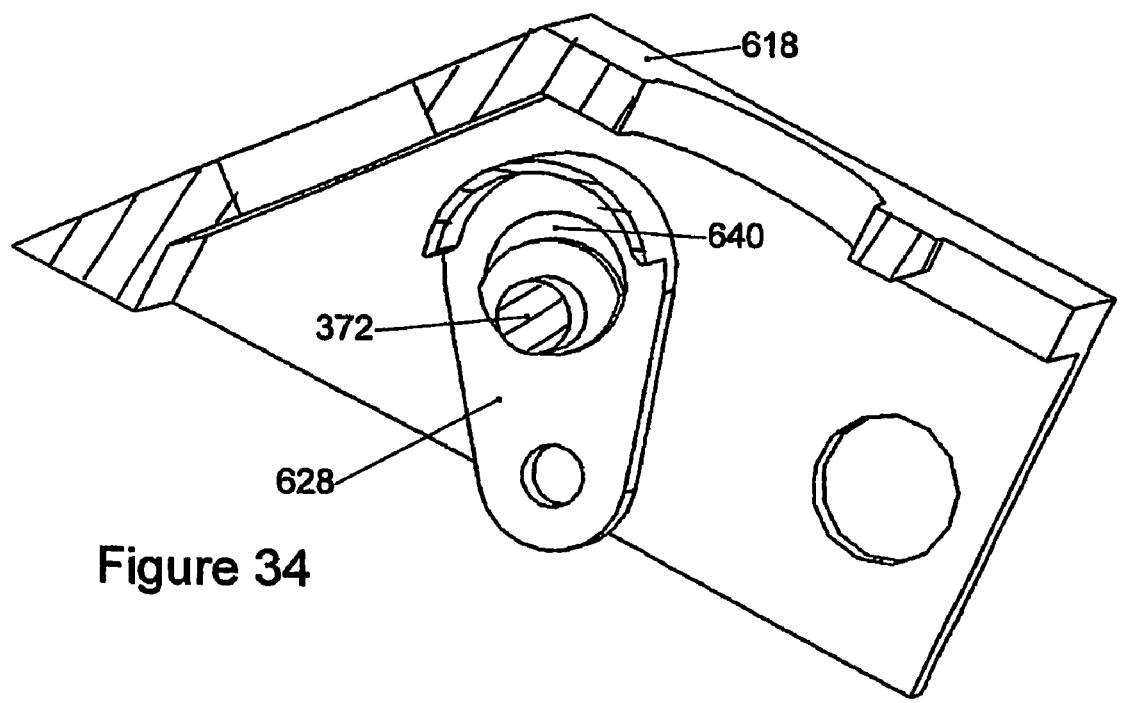
Figure 35:
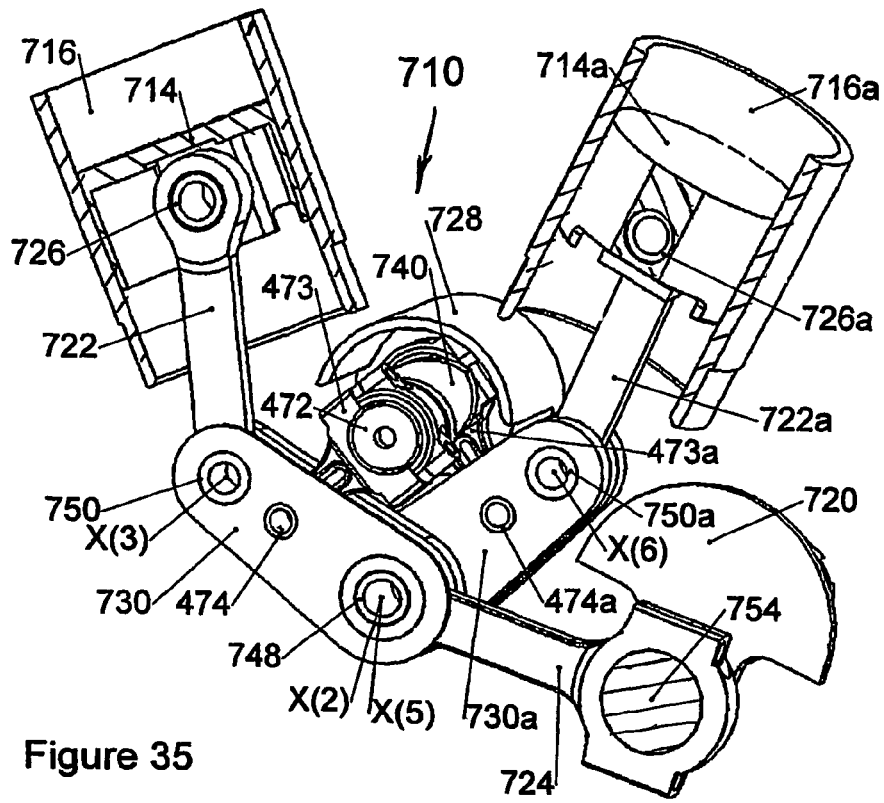
Figure 36:
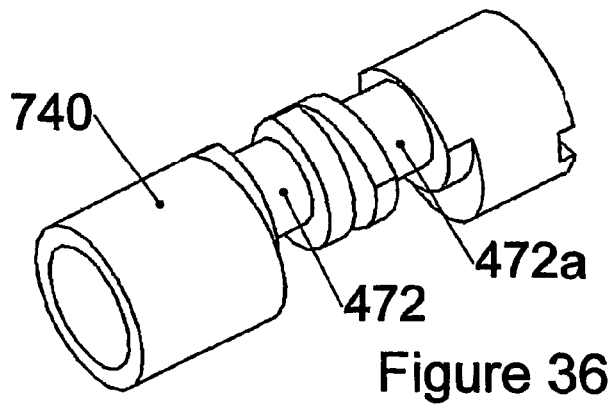
Figure 37:
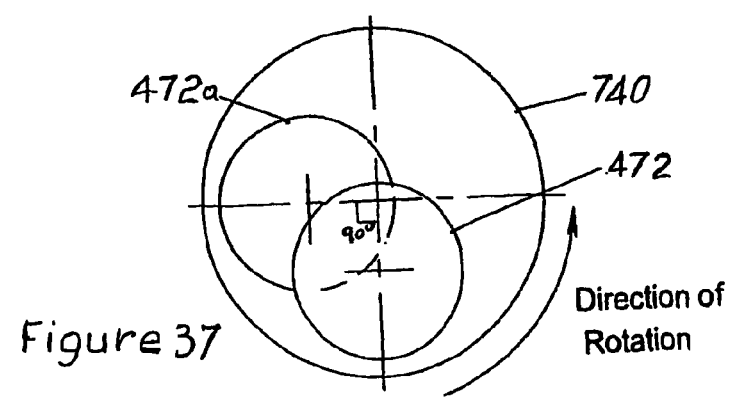
Figure 38:
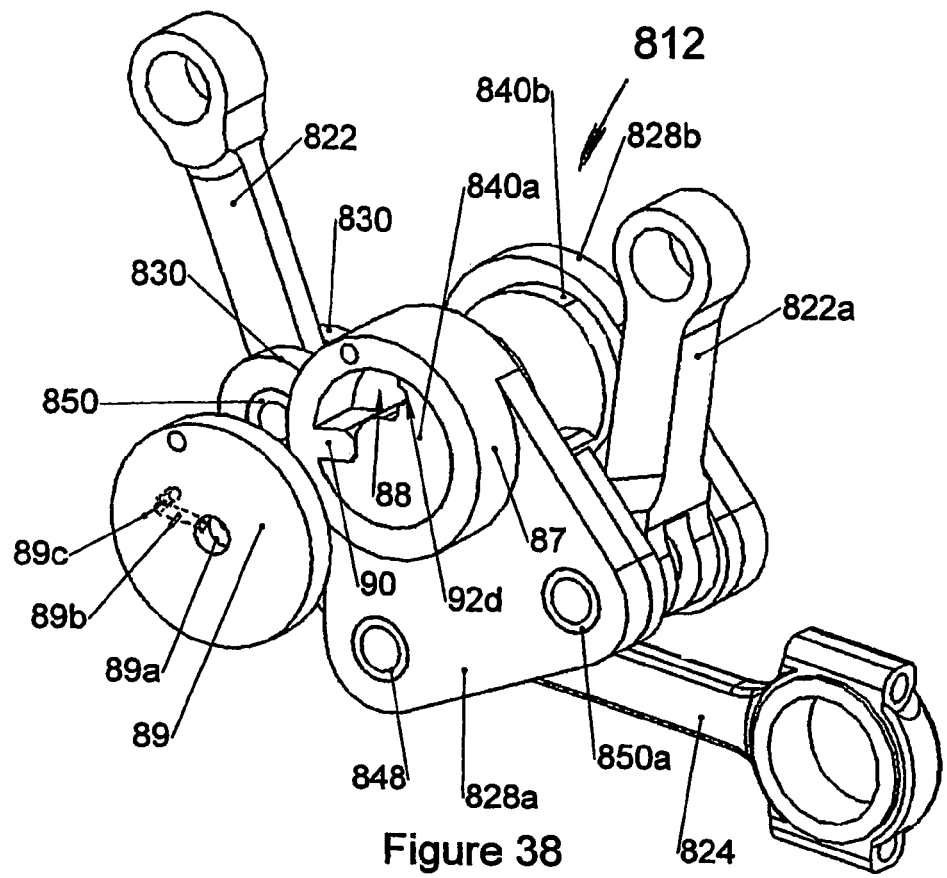
Figure 39:
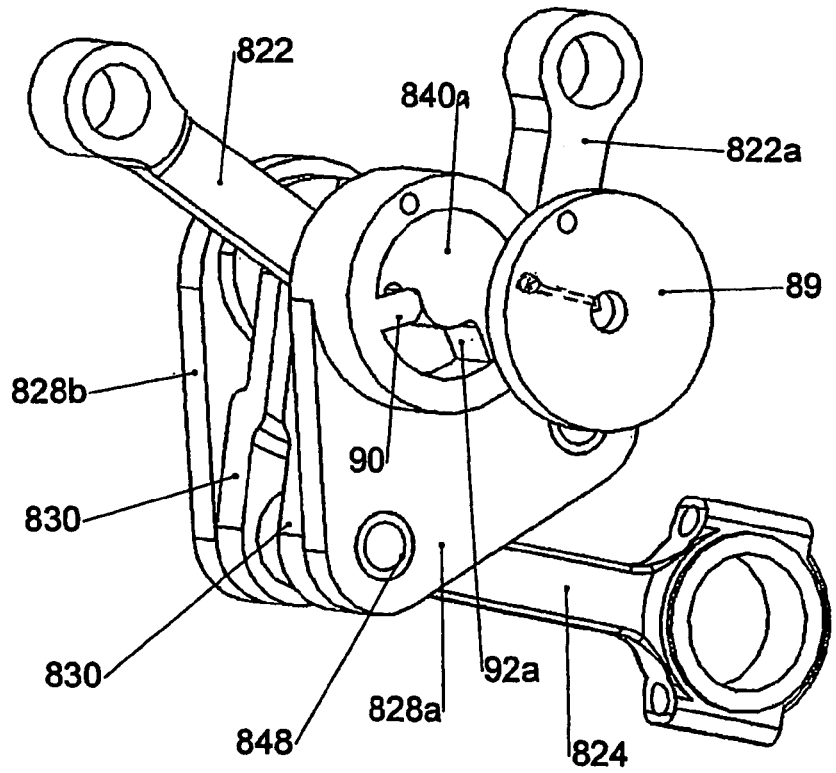
Figure 40:
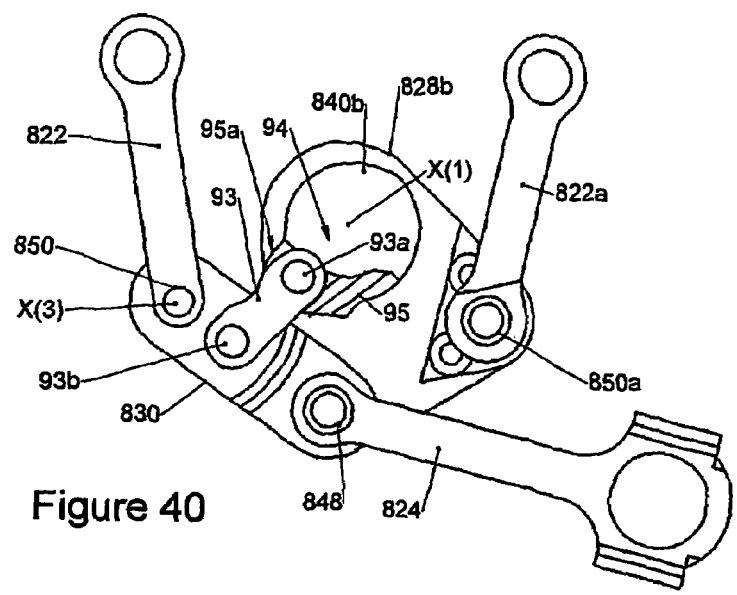
Figure 41:
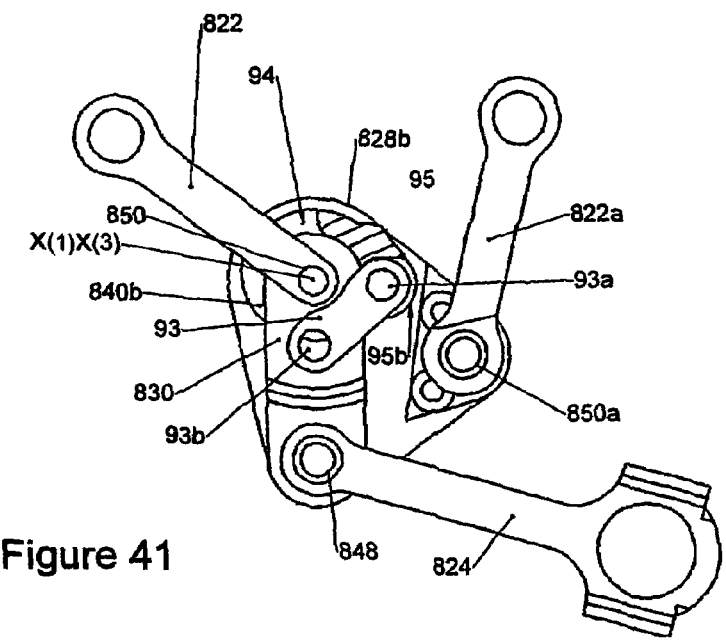
Figure 42:
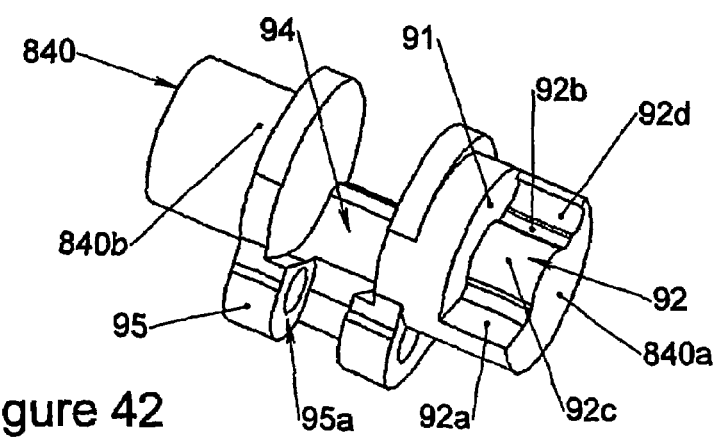
Figure 43:
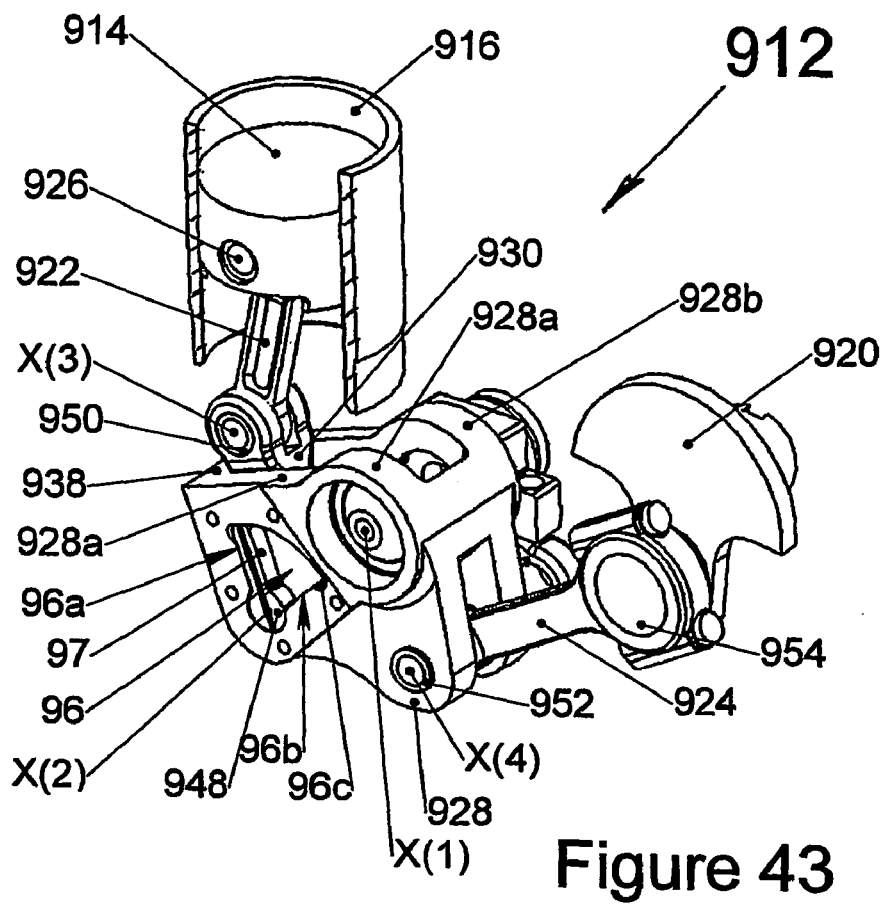
Figure 44:
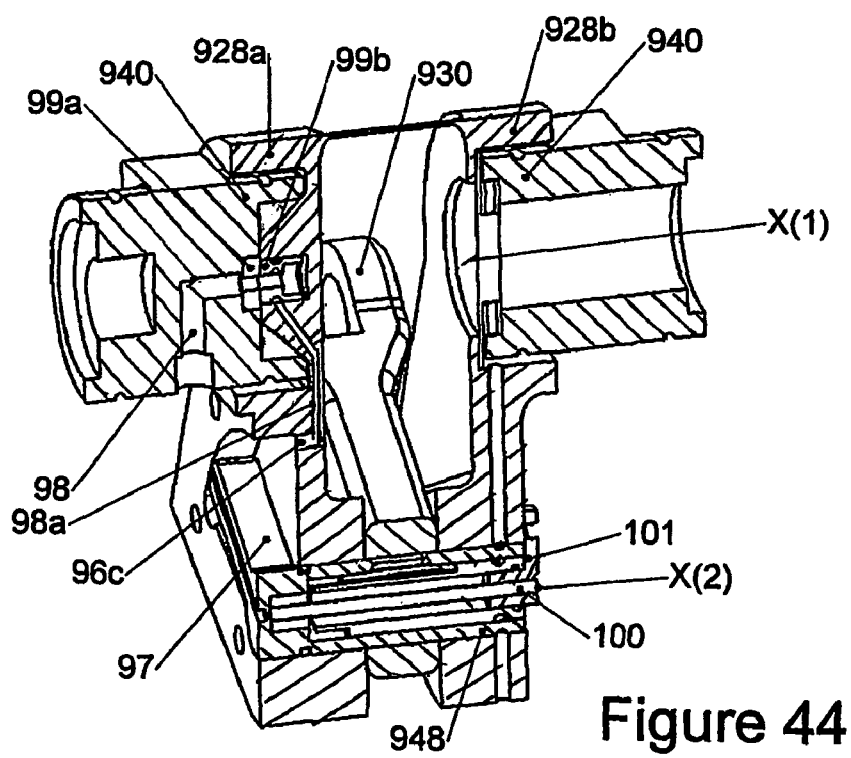

FIG. 4 corresponds to FIG. 1 but shows the engine of the first embodiment in a modified condition;

FIG. 5 is a transverse cross sectional view through a piston/crank assembly of an engine according to a second embodiment of the present invention;

FIG. 6 is a horizontal partly cross sectional view of various components of the engine of the second embodiment, taken on line VI—VI of FIG. 5;

FIG. 7 corresponds to FIG. 5, but shows the engine of the second embodiment in a modified condition;

FIG. 8 is a vertical cross section through a piston/crank assembly of an engine according to a third embodiment of the present invention;

FIG. 9 is a horizontal cross section taken on line IX—IX of FIG. 8;

FIG. 10 corresponds to FIG. 8, but shows the engine of the third embodiment in a modified condition;

FIG. 11 is a transverse cross sectional view through a piston/crank assembly of an engine according to a fourth embodiment of the present invention with the piston at the top-dead-centre position in a first condition;

FIG. 12 corresponds to FIG. 11, but with the piston at the bottom-dead-centre position in the first condition;

FIG. 13 corresponds to FIG. 11, but with the piston at the top-dead-centre position in a second condition;

FIG. 14 corresponds to FIG. 11, but with the piston at the bottom-dead-centre position in the second condition;

FIG. 15 is a transverse cross sectional view showing a component of the engine of the fourth embodiment;

FIG. 16 is a transverse cross sectional view through a piston/crank assembly of an engine according to a fifth embodiment of the invention at the beginning of the power stroke for the piston shown;

FIG. 17 corresponds to FIG. 16, but at the end of the power stroke for the piston shown;

FIG. 18 corresponds to FIG. 16 but at the end of the exhaust stroke for the piston shown;

FIG. 19 corresponds to FIG. 16, but at the end of the induction stroke for the piston shown;

FIG. 20 is a graph for the engine of the fifth embodiment, showing the relation between piston stroke and crank angle over two complete four-stroke cycles;

FIG. 21 is a transverse cross sectional view through a piston/crank engine according to a sixth embodiment of the invention, in a minimum displacement condition with the piston at the top-dead-centre position;

FIG. 22 is an isometric view of the engine of FIG. 21, in the minimum displacement position with the piston at the bottom-dead-centre position;

FIG. 23 is an isometric view of the engine of FIG. 21, in the maximum so displacement condition with the piston at the top-dead-centre position;

FIG. 24 is an isometric view of a component of the engine of FIG. 21;

FIGS. 25 and 26 illustrate minimum and maximum stroke positions respectively of the component of FIG. 24;

FIG. 27 is a transverse cross sectional view through a pair of pistons of an engine according to a seventh embodiment of the present invention, in a minimum displacement condition with one piston at the top-dead-centre position and the other piston at bottom-dead-centre position;

FIG. 28 corresponds to FIG. 27, but with the crankshaft rotated through 180 degrees and the engine in the minimum displacement condition;

FIG. 29 is an isometric sectional view of the engine of FIG. 27, but in the maximum displacement condition with one piston at the top-dead-centre position and the other piston at bottom-dead-centre position;

FIG. 30 corresponds to FIG. 29, but with the crankshaft rotated through 180 degrees and the engine in the maximum displacement condition;

FIG. 31 is an isometric view of the engine of FIGS. 27 to 30 in a minimum displacement mid-stroke position;

FIG. 32 is an isometric view of a component of the engine of FIGS. 29 to 31;

FIG. 33 is a sectioned isometric and partial assembly of components of the engine of FIGS. 29 to 31 as for the minimum displacement position;

FIG. 34 corresponds to FIG. 33, but for the maximum displacement position;

FIG. 35 is a partial isometric view through a pair of piston/crank assemblies of an engine according to an eighth embodiment of the present invention;

FIG. 36 is an isometric view of a component of the engine of FIG. 35; FIG. 37 is an end view of the component of FIG. 36;

FIG. 38 is a perspective view of a rocking mechanism according to a ninth embodiment of the invention, shown in one condition;

FIG. 39 is an alternative perspective view of the mechanism of FIG. 38, shown in another condition;

FIG. 40 is a part sectional view of the mechanism in the condition shown in FIG. 38;

FIG. 41 is similar to FIG. 40, but shows the mechanism in the condition of FIG. 39;

FIG. 42 is a perspective view of a component of the mechanism of FIGS. 38 to 41; and FIG. 43 is a perspective view of a rocking mechanism according to a tenth embodiment of the present invention;

FIG. 44 is a sectional view through the mechanism shown in FIG. 43.

Figure 45:
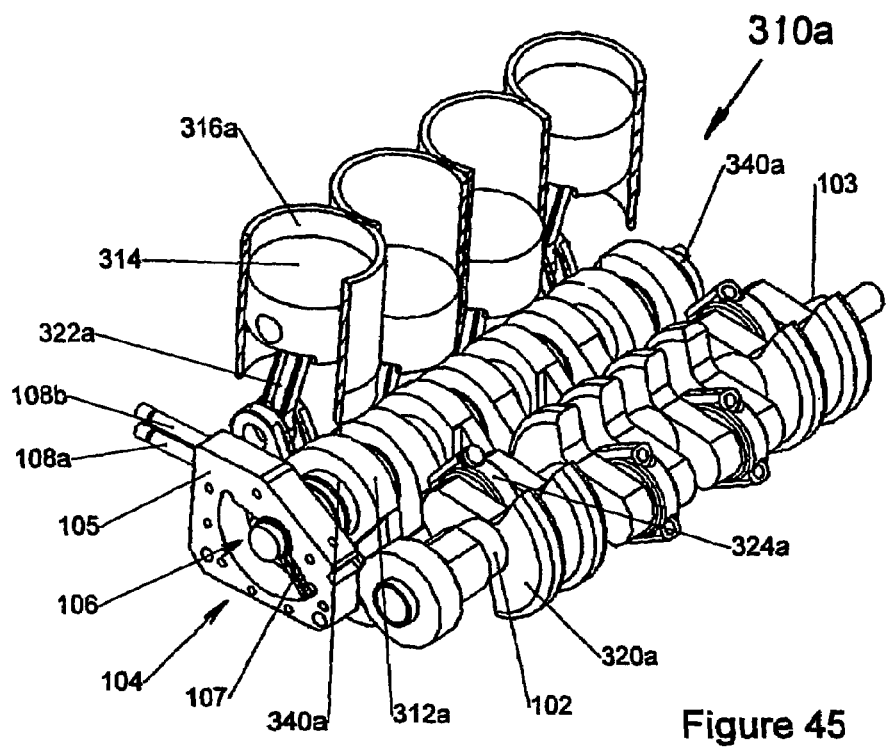
Figure 46:
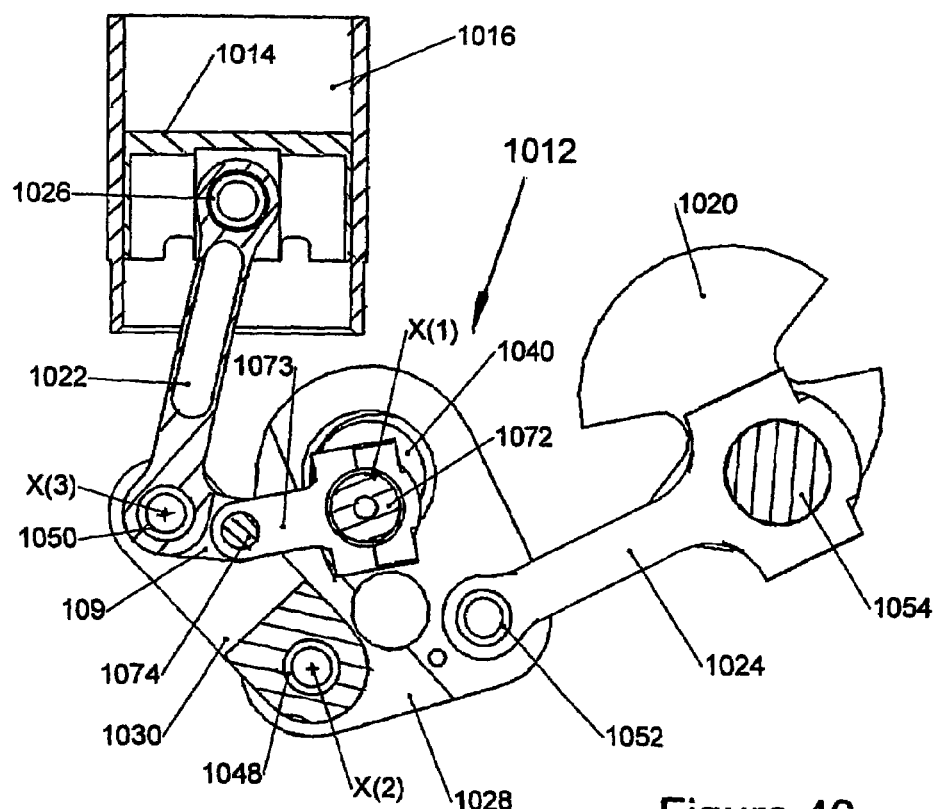

FIG. 45 is a perspective view of part of an in-line engine arrangement based on the fourth embodiment of the present invention; and FIG. 46 is a sectional view of a rocking mechanism according to an eleventh embodiment of the present invention.

DETAILED DESCRIPTION OF THE PREFERRED EMBODIMENTS

FIGS. 1 to 4 illustrate an engine 10 according to a first embodiment of the present invention which incorporates a rocking mechanism 12 according to the present invention. More specifically, the mechanism 12 enables one piston 14 of a plurality of pistons of the engine 10 to be completely de-activated and re-activated as required. The activation/de-activation may be while the engine is in motion, even in motion at a fast rate, as demanded by a vehicle in which the engine 10 is provided, via sensors (not shown) and an engine management system (also not shown).

The engine 10 may have more than one (or even all) of its pistons each provided with a respective mechanism 12. However, as will be understood, the engine 10 needs to have at least two pistons 14 of which at least one needs to remain active at all times the vehicle is in motion. Once the vehicle has become stationary and the ignition turned off, any piston not previously de-activated can be de-activated by the vehicle management system.

With reference firstly to FIGS. 1 and 2, engine 10 includes a cylinder block represented by the one cylinder 16 shown which houses the one piston 14 shown. The arrangement is that of a multi-cylinder engine in which the cylinders are in an in-line configuration extending at right angles to the plane of FIG. 1. Extending from the cylinder block, engine 10 further includes a crankcase 18 which houses rocking mechanism 12 and, off-set to one side of the line of cylinders, a crankshaft 20 having an axis X (FIG. 2). The piston 14 is drivingly connected to the crankshaft 20 by a first con rod 22, rocking mechanism 12 and a second con rod 24. One end of the first con rod 22 is pivotably connected to the piston 14 by a gudgeon pin 26 and, at its other end, to mechanism 12. The second con rod 24 has a little end connected to mechanism 12 and its big end journalled on crankshaft 20.

The rocking mechanism 12 has a rocking member 28, a link member 30 and holding device 32. The rocking member 28 is located between a transverse pair of walls 34 of crankcase 18 which separate the space below cylinder 16 from the space below the or each next cylinder. The crankshaft 20 extends through and is journalled in bearings 35 in walls 34 and successive such walls for other cylinders. The rocking member 28 also has a pair of walls 36, as well as cross-members 38,39 which inter-connect the walls 36. Each wall 36 is parallel to and adjacent to a respective one of walls 34. Member 28 has a respective trunnion pin 40 which extends outwardly from each wall 34. Each trunnion pin 40 is rotatable in a respective bearing 42 in the adjacent wall 34, with pins 40 having a common axis X(1) parallel to crankshaft axis X.

Link member 30 comprises a fork link which has two parallel arms 44 which are laterally spaced from each other and, at one end of member 30, are joined by a cylindrical portion 46. Member 30 is pivotally connected to rocking member 28 by a pin 48 mounted on member 28 being received into portion 46 of member 30 such that pin 48 locates one end, and enables pivoting, of member 30 relative to member 28. The pin 48 defines a pivot axis X(2) for member 30 which is laterally offset from axis X(1) and parallel to axes X, X(1).

The end of each arm 44 of link member 30 remote from pin 48 is pivotably connected to the end of first con rod 22 which is remote from piston 14. That end of con rod 22 is received between the arms 44 and a pin 50 is held captive in aligned openings of member 30 and an opening of con rod 22. The pin 50 defines a pivot axis X(3) for relative pivoting between member 30 and con rod 22. The axis X(3) is offset from axis X(2), and parallel to axes X, X(1) and X(2).

The little end of second con rod 24 is pivotably coupled to rocking member 28 in a similar manner to link member 30. Thus, that end of con rod 24 is received on a pin 52 mounted on member 28, enabling relative pivoting between member 28 and con rod 24. The pin 52 defines a pivot axis X(4) for that pivoting, with axis X(4) offset from axis X(1) and parallel to axes X, X(1), X(2) and X(3). The big end of con rod 24 is journalled on crank pin 54 of crankshaft 20.

While axis X(4) is shown as offset from axis X(2), it will be appreciated from the following description that the position of axis X(4) can vary around an arc centered on axis X(1). Indeed, axes X(2) and X(4) can be co-incident.

The pivoting of link member 30 relative to rocking member 28, on pin 48 and about axis X(2), is controlled by holding device 32 of mechanism 12. As shown in FIG. 3, the holding device 32 comprises a cylinder and piston assembly having a cylinder 56, a piston 58 and an extendable piston rod 60. The cylinder 56 is rotatably connected to link member 30 by a respective trunnion pin 62 journalled in each arm 44 of member 30, intermediate of axes X(2) and X(3). The end of rod 60 outside cylinder 56 is connected to a cross-member 64 which is pivotably linked to rocking member 28 via end pins 66. The cross-member 64 and piston rod 60 allow oil under pressure to be channelled via oil passages 68,69 to a respective side of piston 58 for extending or retracting rod 60.

As piston rod 60 is extended or retracted, link member 30 is caused to pivot on pin 48 relative to rocking member 28. In the arrangement illustrated, the member 30 is able to pivot through an angle determined by the spacing between cross-members 38 and 39 of rocking member 30. The members 38 and 39 thus function as stops. In FIG. 1, rod 60 is shown as extended so that holding device 32 holds link member 30 against the stop comprising cross-member 38. In FIG. 4, rod 60 is shown as retracted so that holding device 32 holds link member 30 against the stop comprising cross-member 39.

In the arrangement of FIG. 1, the linear, reciprocating motion of piston 14 in cylinder 16 is transferred to the crankshaft 20 via first connecting rod 22, forked link member 30, rocking member 28 oscillating on trunnion pins 40, and second connecting rod 24. The geometry of the linkage system as represented in FIG. 1 shows the piston 14 in approximately the mid stroke position with the stroke of piston 14 determined by the position of trunnion pins 40, pin 50 and pin 52, and the throw of crankpin 54. Pins 48 and 50 move through an arc of a circle with the position of pin 54 determined by the desired position of the crankshaft 20.

The connection at pin 50 between connecting rod 22 and forked link 30 is held in position against the stop provided by member 38 fixed in rocking member 28, by the hydraulic cylinder and piston assembly of holding device 32. Oil passages (not shown) to supply passages 68,69 are machined in the rocking member 28 and on either side of the trunnion pins 40, and extend to an external hydraulic control system (not shown). These passages are sealed from the small angular movements of the trunnion pins 40 and pin ends 66, by a series of O-rings (not shown).

Oil under pressure via passage 68 keeps the forked link 30 in the position shown in FIG. 1 and the piston 14 is in its active position. In addition, the angled position of connecting rod 22, as it moves through the stroke, is such that when the piston 14 is in the top dead centre position (TDC), connecting rod 22 is 5 toggled with forked link 30 and constrains the piston 14 by holding the connection between rod 22 and link 30, at pin 50, against the stop provided by cross-member 38.

If oil under pressure is channelled via passage 69 (with passage 68 open to tank), the connection at pin 50, between forked link 30 and connecting rod 22, is pulled away from cross-member 38, with pivoting of link member 30 on pin 48. This is able to continue until pivoting of member 30 is arrested by the connection at pin 50 abutting against the stop provided by cross-member 39. In that position, pin 50 is concentric with the trunnion pins 40, allowing rocking member 28 to oscillate without imparting any motion to the piston 14. The distance between axes X(2) and X(3) is equal to the distance between axes X(2) and X(1). That is, with pin 50 concentric with trunnion pins 40, axis X(3) is co-incident with axis X(1) and oscillating movement of rocking member 28 is able to continue while con rod 22 and, hence, piston 14 remain stationary. Accordingly, piston 14 is de-activated and, of course, the engine management system will have cut off fuel to cylinder 16. As will be appreciated, rocking member 28 will continue to oscillate, due to crankshaft 20 being rotated by other pistons and resultant movement of second con rod 24.

Oil under pressure via passage 68 will restore the position of the connection at pin 50 assembly against stop of cross-member 58 to re-activate piston 14.

It is understood that upon any of the piston de-activation fuel is cut off to that cylinder and re-supplied upon activation.

In a four cylinder engine, for example, one cylinder may have a fixed stroke piston, with each of the others having a de-activateable (D-A) piston. With the so engine in at idle speed or with vehicle under deceleration and/or braking condition, only the fixed stroke piston need be active. For acceleration, each D-A piston can be activated in sequence to allow smooth introduction of power; During cruising conditions, only the number of pistons required, running at optimum efficiency need to be active. Under these operating condition considerable fuel savings are able to be achieved.

FIGS. 5 to 7 illustrate an engine 110 according to a second embodiment of the present invention which incorporates a rocking mechanism 112 according to the invention. Many components of the engine of FIGS. 5 to 7 are similar to those of engine 10 of FIGS. 1 to 4 and, where this is the case, the same reference numeral plus 100 is used. Also, as functioning of engine 110 generally will be understood from the description in relation to FIGS. 1 to 4, the description of engine 110 will be limited to principal features by which it differs from engine 10.

The engine 110 shows an in-line cylinder arrangement, although the features of this can be used in a V-type configuration. The arrangement of engine 110, illustrated with reference to one piston and cylinder, can be used for each piston and cylinder such that the stroke of each piston can be adjusted individually or in groups at a very fast rate as demanded by the vehicle via sensors and an engine management system. In addition, the geometry of the link mechanism can be adjusted to allow for either a nearly constant compression ratio or a variable compression ratio between two extremes. Furthermore, the engine can be operated to switch between the two extreme stroke positions with high compression ratio at a minimum stroke position, and with low compression ratio at a maximum stroke position allowing a turbo-charger or supercharger to further enhance the power range of the engine.

Turning now to FIGS. 5 and 6, the internal combustion engine 110 has a cylinder block defining a plurality of cylinder bores 116 (of which only one is shown). The cylinders 116 are closed at one end by a cylinder head (not shown) which is provided with the usual inlet and exhaust port, valves, actuating gear and ignition device, none of which are shown.

Piston 114 moves in bore 116 and connects to the rocking member 128 of a rocking mechanism 112 via first connecting rod 122 and forked link 130. Connecting rod 122 is pivotally connected to the piston 114 via gudgeon pin 126, and pivotally connected to the forked link 130 via pin 150. The other end of the forked link 130 is pivotally linked to the rocking member 128 by pin 148 fixed on either side of the rocking member 128. The axes X(2) and X(3) of pins 148 and 150 are parallel to each other and to the axis of gudgeon pin 126. Rocking member 128 is pivotally supported within the engine crankcase 118 on support pins 140 on respective bearings 142, with the axis X(1) of pins 140 also parallel with axes X(2) and X(3).

The rocking member 128 connects to the crankshaft 120 via second connecting rod 124. For this, rod 124 is pivotable at one end on pin 152 which is fixed (or journalled) to the rocking member 128, while its other end is journalled on crankpin 154. The position of pin 152 can be placed in a suitable radial position, with respect to the axis of pins 140 on the rocking member 128 to transmit the oscillating motion of member 128 to the crankshaft 120. Thus the linear motion of piston 114 is transferred to the crankshaft 120 via connecting rod 122, forked link 130, rocking member 128 oscillating on support pins 140, and connecting rod 124.

The geometry of the linkage system as represented in FIG. 5 shows the engine 110 in the maximum displacement position with the piston 114 at approximately mid-stroke. The connection at pin 150, between connecting rod 122 and forked link 130 is held in position against a stop 138 fixed in rocking member 128 by a double acting hydraulic ram comprising holding device 132, in a similar manner to holding device 32 of FIG. 3. The ram 132 has one end pivotally connected to the rocking member 128 by pins 164 and to the forked link 130 by pins 162. The hydraulic ram 132, not fully detailed, may be a standard component allowing hydraulic fluid under pressure, and via external valving, to push or retract its internal piston within its extremities. At the maximum stroke position for piston 114 the ram 132 is fully extended.

The stroke of piston 114, represented by linear movement B in FIG. 5, is determined by the corresponding linear movement component C of pin 150, as pin 150 swings through arc D centered on the axis X(1) of pins 140. For the minimum stroke position, reference is made to FIG. 7 in which the piston of the hydraulic ram 132 is fully retracted, such that forked link 130 has been pulled against stop 139 of rocking member 128 by pivoting on pin 148. The pivoting position of pin 148 and the length of forked link 130 describe an arc for pin 150 between the maximum stroke position and minimum stroke position. Essentially, the piston 114 is always made to operate from the top of cylinder 116 plus allowance for compression ratio adjustments. The arc for pin 150 is to be kept as flat as possible to minimise the effect of compression ratio variations between the two displacement extremes. However, the shape of the compression ratio variations can be designed to allow for supercharging, thus producing a variable compression ratio.

In FIG. 7 the stroke of piston 114, represented by linear movement E, is determined by corresponding linear movement component F of pin 150 as it swings through an arc G (also centered on the axis X(1) of pins 140). It is to be noted that the arcs D and G swing through the same angle 6 determined by the position of pin 152, pivotally on rocking member 128, and the throw of crankshaft 120. It is to be understood that the variable displacement engine 110 can be adapted to operate under various conditions, for example:

In one arrangement, the engine 110 can be adapted to operate as a two position capacity engine having two displacement positions only, minimum and maximum, with either the same compression ratio or different compression ratios to allow turbo or super-charging at the maximum displacement position.

In a second arrangement, the engine 110 can be adapted to operate as avariable capacity engine throughout its variable range by controlling the position of the hydraulic ram 132. A pre-determined compression ratio curve can be applied.

In a third arrangement, each piston assembly of the multi cylinder engine 110, can be adapted to operate independently to achieve greater variability of displacement.

FIGS. 8 to 10 illustrate an engine 210 according to a third embodiment of the present invention which incorporates a rocking mechanism 212 according to the invention. Many components of the engine of FIGS. 8 to 10 are similar to those of engine 10 of FIGS. 1 to 4 and, where this is the case, the same reference numeral plus 200 is used. Also, as functioning of engine 110 generally will be understood from the description in relation to FIGS. 1 to 4, the description of engine 110 will be limited to principal features by which it differs from engine 10.

As with engine 10 of FIGS. 1 to 4, engine 210 enables complete de-activation and re-activation of pistons, either individually or in groups. This is possible while the engine is in motion, even at a very fast rate, as demanded by a vehicle in which the engine is provided via sensors and an engine management system. The engine 210 of FIGS. 8 to 10 is specifically one of a V-type multi-cylinder configuration in which one bank of cylinders can be made to operate continually while pistons of the cylinders of the other bank can be de-activated or re-activated either one at a time or in groups. In this regard, it is to be appreciated that, for compactness, the complete engine would have one bank of pistons that remains active at all times. However, by offsetting the pistons in each bank relative to each other, the second bank of pistons can also be de-activated (less one or two of them), or can be made to vary their stroke in a similar manner to engine 110 of FIGS. 5 to 7. The ability of one bank to have each piston deactivated separately or in groups, as required, can enable substantial fuel economy, particularly in city or cruising driving conditions.

Referring initially to FIGS. 8 and 9, the engine 210 has a crankcase 218. Above crankcase 218, engine 210 has two banks of piston/cylinder assemblies each represented by a respective piston 214,214a in a cylinder 216,216a, respectively. Each piston 214 connects via connecting rod 222, a rocking mechanism 212 and con rod 224 to crankshaft 220. Overall, the arrangement for each piston 216 is similar to that for the in-line configuration of engine 10 of FIGS. 1 to 4, and description therefore will be limited to features of difference between the arrangement of engine 10 and that of engine 210. The first difference is that rocking member 228 of engine 210 is of a diamond shape, such that it projects beyond pins 240 and 248 in a direction away from pin 250. The other difference is that link member 230 comprises a parallel pair of elongate link plates which are not joined at their ends pivotable on pin 248.

Each piston assembly 214a connects to the rocking member 228 via connecting rod 222a which is rotatably connected to the piston 214a by gudgeon pin 226a and pivotally connected to rocking member 228 via pin 250a.

Rocking member 228 is pivotally connected to the crankcase 218 via two trunnion pins 240 journalled in the crankcase 218, and via bearings 242, at a suitable mid point between the two banks of cylinders to provide articulation of the con rods 222 and 222a as the respective pistons 214 and 214a move through their stroke limits.

The rocking member 228 is connected to the crankshaft 220 via connecting rod 224. The small end of connecting rod 224 is pivotally mounted by pin 248 between the two links 230, such that the axes X(2) and X(4) are co-incident. However, the con rod 224 can also be connected to other points on the rocking member 228 to suit different configurations. The big end of the connecting rod 224 connects to the crankshaft 220 via crankpin 254.

Thus reciprocating motion of piston 214 is transferred to the crankshaft 220 via connecting rod 222, links 230, rocking member 228 oscillating on trunnion pins 240, and connecting rod 224. The geometry of the linkage system is represented in FIG. 8 showing the piston 216 in approximately the mid stroke position with the stoke of piston 216 determined by the position of trunnion pins 240, pins 248 and 250, and the throw of crankpin 254.

The connection at pin 248, between connecting rod 222 and links 230, is held in position against a stop, provided by cross-member 238 of rocking member 228, by the hydraulic piston ram comprising holding device 232. The ram is not fully detailed as it is a conventional piston and cylinder type and similar to the holding device 32 more fully described in relation to engine 10 of FIGS. 1 to 4. The hydraulic ram 232 is pivotally mounted in two positions, with the piston rod 260 pivotally mounted on the rocking member 228, and the cylinder 256 pivotally mounted between the two links 230. In the position of FIG. 8, the hydraulic ram 232 is fully extended representing activation of the piston 214. Hydraulic oil passages (not shown) are machined in the rocking member 228 and on either side of the trunnion pins 240, and receive oil under pressure from an external hydraulic control system (not shown).

The angled position of connecting rod 222, as it moves through the stroke arc, is such that when the piston 214 is in the top dead centre position (TDC), connecting rod 222 is toggled with links 230 and constrains the piston 216 by holding the connection at pin 250 against stop at member 238.

The de-activation of piston 214 is illustrated in FIG. 10, in which the hydraulic ram 232 is retracted by the hydraulic circuit and control system. This pulls the connection at pin 250 against stop provided by cross-member 239. In this position, pin 250 is concentric with the trunnion pins 240, such that axes X(1) and X(3) are co-incident, allowing rocking member 228 to oscillate without imparting any motion to the piston 214. The fixed stroke piston 214a and other parallel pistons in its cylinder bank, on the other hand, continue the rotational motion of the crankshaft 220 and this drive is not variable in engine 210.

It is understood that upon de-activation of any piston 214, fuel is cut off to the respective cylinder 216, but re-supplied for re-activation.

In V-type engines, it is common for the two banks of cylinders to be offset to allow connection of the connecting rods to the crankshaft and for compactness. This feature is also beneficial for the de-activateable engine 210. Referring to FIG. 9, the offset cylinders are represented by thick lines 70 and 71 and allow the crankshaft 220 to be closely coupled to the rocking member 228 via pin 248.

In a V-6 cylinder engine 210, for example, the three cylinders of one bank may have fixed stroke pistons 214a with the three cylinders of the other bank having three de-activateable (D-A) pistons 214. With the engine 210 at the idle speed or with the vehicle under deceleration and/or braking condition, only the fixed stroke pistons need be active. During acceleration, each D-A piston can be activated in sequence to allow smooth introduction of power. During cruising conditions, only the number of pistons required, running at optimum efficiency need to be active. Under these operating condition considerable fuel savings are able to be achieved.

The hydraulic ram 232 can be replaced by a hydraulic rotary actuator the output shaft of which is fixed and concentric with pin 248. If this system is used, links 230 would be fixed to pin 248, with pin 248 pivotally connected to rocking member 228.

FIGS. 11 to 15 illustrate an engine 310 according to a fourth embodiment of the present invention which incorporates a rocking mechanism 312 according to the invention. Many components of the engine of FIGS. 11 to 15 are similar to those of engine 110 of FIGS. 5 to 7 and, where this is the case, the same reference numeral plus 200 is used. Also, as functioning of engine 310 generally will be understood from the description in relation to FIGS. 5 to 7, the description of engine 310 will be limited to principal features by which it differs from engine 110.

Engine 310 incorporates a mechanism for varying the stroke of each piston in a multi-cylinder arrangement. The stroke of engine pistons can be adjusted at a very fast rate as demanded by the vehicle via sensors and an engine management system. In addition, the geometry of the link mechanism, and hence the relative spacing between pivot axes $X(1)$, $X(2)$, $X(3)$ and $X(4)$ and axis X, can be adjusted or selected to allow for either a nearly constant compression ratio or a variable compression ratio between its two extremes. Furthermore, the engine can be operated to switch between its two extreme stroke positions allowing high compression ratio at its minimum stroke position, and low compression ratio at the maximum stroke position allowing a turbocharger or supercharger to further enhance the power range of the engine.

Referring to FIGS. 11 and 12, internal combustion engine 310 has a cylinder block defining a plurality of cylinder bores 316, of which one is shown. The cylinders 316 are closed at one end by a cylinder head (not shown) which is provided with the usual inlet and exhaust port, valves, actuating gear and ignition device, none of which are shown.

Piston 314 moves in cylinder 316 and connects to a rocking member 328 via connecting rod 322 and forked link 330 (although link 330 could be replaced by a pair of parallel links). Connecting rod 322 is pivotally connected to the piston 314 via gudgeon pin 326, and pivotally connected to the forked link 330 via pin 350. The other end of the forked link 330 is pivotally linked to the rocking member 328 by pin 348 fixed on either side of the rocking member 328. The axes $X(2)$ and $X(3)$ of pins 348 and 350 and the axis of gudgeon pin 326 are parallel to each other. Rocking member 328 is pivotally supported in a selected geometric position on adjusting shaft 340 which extends parallel to the engine crankshaft 320 and each of pins 348, 350 and 326. Adjusting shaft 340 is rotatable on bearings (not shown) provided within the cylinder block in webs separating the cylinders 316. Adjusting shaft 340 has an eccentric 72, while a connecting rod 73 extends between eccentric 72 and forked link 330. One end of rod 73 is rotatable on eccentric 72, while its other end is pivotably positioned between the arms of forked link 330 by a pin 74. Indeed, pins 74 and 350 can be co-incident.

The rocking member 328 connects to the crankshaft 320 via connecting rod 324. One end of rod 324 is connected to member 328 by pin 352, while its other end is journalled on crankpin 354. The position of pin 352 can be placed in a suitable radial position on the rocking member 328 to transmit the oscillating motion to the crankshaft 320. Thus the linear motion of piston 314 is transferred to the crankshaft 330 via connecting rod 322, forked link 330, rocking member 328 oscillating on adjusting shaft 340, and connecting rod 324.

The geometry of the linkage system as represented in FIG. 11 shows the engine 310 in the maximum displacement position with the piston 314 at top-dead-centre. The connection at pin 350, between connecting rod 322 and forked link 330, is held in position by holding device including a connecting rod 73 and an eccentric 72 to which rod 73 is pivotally connected; with eccentric 72 projecting from adjusting shaft 340. The position of the eccentric 72 is controlled by the rotational position of adjusting shaft 340. The position of shaft 340 is in turn controlled by the rotary actuator system 75 of holding device 332. System 75, as shown in FIG. 15, comprises a housing 76, and actuator vane 77 rotatable with shaft 340 and with appropriate seals 78, able to rotate between stop limits 79 and 80. Stop 79 represents maximum stroke position and stop 80 represents minimum stroke position.

Oil channels 81 and 82 communicating with respective ports 83 and 84 on either side of actuator vane 77, allow oil under pressure from a conventional external high pressure pump and valves (not shown). The oil is supplied to control the position of the vane 77 and thus the adjusting shaft 340, in response to the electronic engine management system determining the power demand of a vehicle from the engine 310.

FIG. 12 represents the engine 310 in the bottom-dead-centre position at maximum stroke.

For the minimum stroke position, reference is made to FIG. 13 in which the vane 77 of rotary actuator 75 is made to rotate up to stop 80 and thus rotating shaft 340 to move its eccentric 72 to the position shown in FIG. 13. This rotational action moves forked link 330 via connecting rod 73 towards the centre of adjusting shaft 340, effectively reducing the stroke of piston 314. FIG. 14 shows the engine 310 at minimum stroke and at the bottom-dead-centre position.

It is to be noted that at the minimum stroke position the top of piston 314 at top-dead-centre position moves higher up the cylinder 316 to compensate for the compression ratio. However, the respective geometries of pins 326, 348, 350 and 74 and eccentric 72, can be selected to provide various piston adjustments and compression ratio variations, as desired by the engine designer.

It is to be understood that the variable displacement engine 310 can be adapted for operation under various conditions. In one arrangement the engine 310 can be adapted to operate as a two position capacity engine having two displacement positions only, minimum and maximum, with either the same compression ratio or different compression ratios to allow turbo or super-charging at the maximum displacement position. In a second arrangement the engine 310 can be adapted to operate as a variable capacity engine throughout its variable range by controlling the position of the rotary actuator 75.

While the description in relation to FIGS. 11 to 15 is of the one piston 314 and mechanism 312 shown, it is to be understood that the same description applies to each piston of the in-line configuration. That is, engine 310 is a multi-cylinder in-line variable stroke engine and each piston has a respective mechanism 312. However, adjusting shaft is common to each mechanism 312, and has a respective eccentric 72 by which the stroke of each piston is simultaneously varied by rotation of shaft 340. Thus each eccentric 72 on adjusting shaft 340 is in the same axis relative to the axis X(1) of shaft 340.

FIGS. 16 to 19 illustrate an engine 410 according to a fourth embodiment of the present invention which incorporates a rocking mechanism 412 according to the invention. Many components of the engine of FIGS. 16 to 19 are similar to those of engine 310 of FIGS. 11 to 15 and, where this is the case, the same reference numeral plus 100 is used. Also, as functioning of engine 410 generally will be understood from the description in relation to previously described embodiments, the description of engine 410 will be limited to principal features by which it differs from engines of these embodiments.

FIGS. 16 to 19 relate to an IC engine mechanism enabling a practical Atkinson Cycle motion in which the power stroke, of a four-stroke cycle, is substantially longer than the induction stroke. An Atkinson Cycle is acknowledged to contribute substantially to fuel economy improvements in a motor vehicle applications.

While the original Atkinson Cycle produced a complete four stroke cycle for one revolution of its crankshaft, it was not of compact proportions considered to be practical for automotive use. However, an arrangement which simulates an Atkinson Cycle was developed and is known as the Miller Cycle. In that arrangement a conventional engine mechanism is used. A late closing of the inlet valve allows some of the induced charge to be expelled into the manifold and effectively reduces the induced air volume, but limited in its effectiveness.

The engine 410 of FIGS. 16 to 19 utilises a mechanism which enables a transfer of piston motion to the engine crankshaft which is better suited to extracting the benefits envisaged for the original Atkinson Cycle, in which the induction and compression strokes are short but with the power and exhaust strokes long. This allows the combustion to expand over a longer distance and thus extract more work from a fuel charge, leading to improved fuel consumption. Further improvements in fuel economy can be achieved with engine 410 due to it allowing the compression ratio to be varied during operation, and thus also allowing turbochargers and supercharges to be used for optimum performance and economy.

Referring to FIGS. 16 to 19, IC engine 410 has a cylinder block defining a plurality of cylinder bores 416. The cylinders 416 are closed at one end by a cylinder head which is provided with the usual inlet and exhaust ports, valves, actuating gear and ignition device, none of which is shown.

A piston 414 moves in cylinder 416 and connects to the rocking member 428 via connecting rod 422 and forked link 430. Connecting rod 422 is pivotally connected to the piston 414 via gudgeon pin 426, and pivotally connected to the forked link 430 via pin 450. The other end of the forked link 430 is pivotally linked to the rocking member 428 by pin 448 fixed on either side of the rocking member 428. The axes X(2) and X(3) of pins 448 and 450 and the axis of gudgeon pin 426 are parallel to each other. Rocking member 428 is pivotally supported on shaft 440 which extends parallel to the engine crankshaft 420 and all of the pins 426, 448 and 450. Shaft 440 is rotatable on bearings (not shown) within the engine block in webs separating the cylinders 416 and the main bearings (not shown) of crankshaft 420. Shaft 440 has holding device including an eccentric 172, and a connecting rod 173 which extends between eccentric 172 and forked link 430. One end of rod 173 is rotatable on eccentric 172, while its other end is pivotably connected to link 430 via pin 174. (Pins 174 and 450 can be co-incident)

The rocking member 428 connects to the crankshaft 420 via connecting rod 424. One end of con rod 424 is journalled on crank pin 454, while its other end is fixed to the rocking member 428. In this embodiment, connecting rod 424 shares the same pin 448 with the forked link 430 connected to oscillating member 428. However an additional pin can be suitably located within an enlarged rocking member 428, if required, allowing the connecting rod 424 and crankshaft 430 to be positioned at a different location on either side of the crankcase 418 relative to the cylinder bore 416.

The Atkinson cycle is achieved by rotating shaft 440 and thus eccentric 172 at half the rotational speed of crankshaft 420 preferably, but not necessarily, in the same direction of crankshaft 420. For this, shaft 440 is drivingly connected by drive device (not shown), such as by gears or chain drive, to crankshaft 420 with a fixed ratio of one to two respectively. Shaft 440 has the added function of supporting the oscillating rocking member 428.

Thus the linear motion of piston 414 is transferred to the crankshaft 420 via connecting rod 422, forked link 430, rocking member 428 and connecting rod 424. Shaft 440, eccentric 172 and connecting rod 173 control the variation of stroke of piston 414. The rotational position of eccentric 172 relative to the crankshaft 420 position is pre-determined to achieve the desired geometric relationship for an Atkinson Cycle.

The geometry of the linkage system as represented in FIG. 16 shows the engine 410 with the piston 414 at top-dead-centre and with the relative positions of eccentric 172 and crankshaft 420, with the engine at the beginning of a power stroke.

FIG. 17 represents the engine 410 in the bottom-dead-centre position at the completion of the power stroke. The eccentric 172 has rotated 90 degrees with respect to the crankshaft 420, while the crankshaft has rotated through 180 degrees.

FIG. 18 represents the engine 410 in the top-dead-centre position at the completion of the exhaust stroke and the beginning of the induction stroke. The eccentric 172 has rotated a further 90 degrees relative to the crankshaft 420, while the latter has rotated a further 180 degrees.

FIG. 19 represents the engine 410 in the bottom-dead-centre position at the completion of the induction stroke and the beginning of the compression stroke. The eccentric 172 has rotated a further 90 degrees relative to the crankshaft 420, while the crankshaft 420 has rotated a further 180 degrees.

It is to be noted that throughout the variations of stroke of the piston 414, the action of the eccentric 172 via connecting rod 173, is to allow the forked link 430 pivoting on pin 448, to expand and contract, relative to the rotational position of shaft 440.

For a multi-cylinder in-line variable stroke engine, each eccentric 172 on shaft 440 follows the same angular offset of the crankpin 454 on crankshaft 420.

FIG. 20 is a graphical representation of the piston 414 movement relative to the rotational angle of the crankshaft 420. It is to be noted that the Induction and Compression strokes are short with the Power and Exhaust strokes long. Due to this, engine 410 will extract more work from a given amount of fuel and thus contribute to improved economy.

By introducing variable timing between the shaft 440 and crankshaft 420 (in a similar manner to a variable valve timing mechanism in conventional engines) the characteristics of the Atkinson Cycle can be altered as desired, as well as having the ability to alter the compression ratio, further improving the efficiency of the engine.

It is to be understood that the mechanism of FIGS. 16 to 19 can be applied to various configurations of internal combustion engines, such as V-engines as well as in-line engines.

FIGS. 21 to 26 illustrate an engine 510 according to a sixth embodiment of the present invention which incorporates a rocking mechanism 512 according to the invention. Many components of the engine of FIGS. 21 to 26 are similar to those of engine 310 of FIGS. 11 to 15 and, where this is the case, the same reference numeral plus 200 is used. Also, as functioning of engine 510 generally will be understood from the description in relation to FIGS. 11 to 15, the description of engine 510 will be limited to principal features by which it differs.

The fourth embodiment of FIGS. 11 to 15 provides a variable stroke piston engine 310 able to be switched between two displacement positions with a respective compression ratio at each of those positions. The engine 310 operates with a wide variation of compression ratios as it is traversed between its two positions, this limits its utility if the engine is required to be operated as a continually variable displacement engine. Engine 510 is able to overcome this as it allows the compression ratio to be kept at a more consistent and useful level throughout it stroke varying range.

FIGS. 21 and 22 show IC engine 510 has a cylinder block defining a plurality of cylinders of which one is shown at 516. The cylinders 516 are closed at one end by a cylinder head which is provided with the usual inlet and exhaust port, valves, actuating gear and ignition device, none of which are shown.

A piston assembly 514 moves in cylinder 516 and connects to a parallel pair of rocking members 528, only one of which is shown for clarity, via connecting rod 522 and forked link 530. Connecting rod 522 is pivotally connected to the piston 514 via gudgeon pin 526, and pivotally connected to the forked link 530 via pin 550. The other end of the forked link 530 is pivotally linked to the rocking member 528 by pin 548 journalled on either side of the pair of rocking members 528. The axes of pins X(2) and X(3) of pins 548 and 550 and of gudgeon pin 526 are parallel to each other.

Referring to FIGS. 22 and 24, adjusting shaft 540 is rotatable via journals 80 and 81 on respective bearings (not shown) within the engine block webs (not shown) which separate the cylinders 516 and crankshaft 520 on conventional main bearings, not shown.

Adjusting shaft 540 has eccentric 272 represented by position 'B1 in FIG. 25, rotatably connected to connecting rod 273 linked to forked link 530 via pin 274 and is positioned in a selected geometric position parallel to the engine crankshaft 520 and all of the pins 526, 548 and 550.

Rocking members 528 are rotatably supported on mutually concentric eccentrics 85 and 86 of adjusting shaft 540. Eccentrics 85 and 86 allow for the compression ratio to be kept within acceptable limits and its stroke is small relative to the stroke adjusting eccentric 272 represented by position 'A1 in FIG. 26. Also, the rotational centre of eccentrics 85 and 86 is generally positioned opposite to the centerline bisecting the rotational angle of the adjusting shaft 540 between minimum and maximum stroke positions. Refer to FIG. 25.

The rocking member 528 connects to the crankshaft 520 via connecting rod 524. One end of con rod 524 is pivotable on pin 552 mounted on rocking member 528, while the other end is journalled on crankpin 554. The position of pin 552 can be placed in a suitable radial position on the rocking member 528 or, alternatively, the one end of rod 524 can be pivotable on pin 548, to transmit the oscillating motion of rocking member 528 to the crankshaft 520. Thus the linear motion of piston 514 is transferred to the crankshaft 520 via connecting rod 522, forked link 530, rocking member 528 oscillating on adjusting shaft 540, and connecting rod 524.

The geometry of the linkage system as represented in FIG. 21 shows the engine 510 in the minimum displacement position with the piston 514 at top-dead-centre. The connection at pin 550 between connecting rod 522 and forked link 530 is held in position by connecting rod 273 pivotally connected to eccentric pin 272 on adjusting shaft 540. The position of the eccentric 272 and eccentrics 85 and 86 is controlled by the rotational position of adjusting shaft 540 which is in turn controlled by an electronic engine management system via a rotary actuator system as fully described in relation to engine 310 of FIGS. 16 to 20.

For a multi-cylinder in-line variable stroke engine each eccentric 272 on the shaft 540 is in the same axis relative to axis X(1) of the shaft 540.

FIG. 23 represents the engine 510 in the top-dead-centre position at maximum stroke. Adjusting shaft 540 has been rotated, anti-clockwise in this preferred case, and in the same rotational direction of the crankshaft 520, through an angle generally less than 180 degrees. The adjusting shaft 540 can also be rotated in a clockwise direction. However the position of all eccentrics on adjusting shaft 540 may need to be altered to produce the desired compression ratio characteristic.

The respective geometries or spacing between of pins 526, 548, 550 and 274, and the form of eccentrics 272, 85 and 86, can be selected to provide various piston adjustments and compression ratio variations, as desired by the engine designer.

FIGS. 27 to 34 illustrate an engine 610 according to a seventh embodiment of the present invention which incorporates a rocking mechanism 612 according to the invention. Many components of the engine of FIGS. 27 to 34 are similar to those of engine 510 of FIGS. 21 to 26 and, where this is the case, the same reference numeral plus 100 is used. Also, as functioning of engine 610 generally will be understood from the description in relation to FIGS. 21 to 26, the description of engine 610 will be limited to principal features by which it differs from engine 510.

Engine 610 also provides a practical multi-cylinder engine operable to vary the stroke of each piston, but in a V-type engine configuration. The stroke can be varied at a very fast rate as demanded by a vehicle in which the engine is used, via sensors and an engine management system. The arrangement can be such as to enable either a nearly constant compression ratio at maximum and minimum stroke positions, or different ratios at its two extremes to allow a high compression ratio at its minimum stroke position, and a low compression ratio at the maximum stroke position allowing a turbo-charger or supercharger to further enhance the power range of the engine.

FIGS. 27 and 28 show IC engine 610 has a cylinder block defining cylinders 616 and 616*a* in respective banks of a V-type configuration. The cylinders 616 and 616*a* are closed at one end by cylinder heads (not shown), which are provided with the usual inlet and exhaust port, valves, actuating gear and ignition device.

In each cylinder 616, a respective piston 614 is moveable and is connected to a rocking member 628 via connecting rod 622 and a pair of parallel links 630. Connecting rod 622 is pivotally connected to the piston 614 via gudgeon pin 626, and pivotally connected to one end of the links 630 via pin 650. The other end of the links 630 is pivotally linked to the rocking member 628 by pin 648 fixed on either side of the rocking member 628. The axes X(2) and X(3) of pins 648 and 650 and the axis of pin 626 are parallel to each other. Rocking member 628 is pivotally supported at two positions on adjusting shaft 640 in a selected geometric position longitudinal along the engine block and parallel to the engine crankshaft 620 and all of the pins 626, 648 and 650. Adjusting shaft 640 is rotatable on bearings (not shown) within the engine block webs separating the bores of cylinders 616 and 616*a* and conventional main bearings (not shown) for crankshaft 620. Adjusting shaft 640 has an eccentric 372 rotatably connected to connecting rod 373 linked to links 630 via pin 374. (Pins 374 and 650 can be co-incident).

Similarly, piston assembly 614*a* moves in cylinder 616*a* and connects to the rocking member 628 via connecting rod 622*a* and a pair of parallel links 630*a*. Connecting rod 622*a* is pivotally connected to the piston 614*a* via gudgeon pin 626*a*, and pivotally connected to the links 630*a* via pin 650*a*. The other end of the links 630*a* is pivotally linked to the rocking member 628 by the same pin 648 as the links 630. The axes X(5) and X(6) of pins 648*a* and 650*a* and the axis of gudgeon pin 626*a* are parallel to each other. As shown in FIG. 31, rocking member 628 straddles all other components of the rocking mechanism 612 and provides a strong connection to the crankshaft 620 via pin 648 and connecting rod 624. A second connecting rod 373*a* is rotationally mounted on eccentric 372 of adjusting shaft 640 and is connected to links 630*a* via pin 374*a*. (Pins 374*a*, 650*a* can be co-incident). The two banks of cylinders in the multi-cylinder engine 610 represented by cylinders 616 and 616*a* are displaced (or offset) from each other to allow parallel assembly of the two links 630 and 630*a* on the common pin 648.

For a multi-cylinder V-type variable stroke engine each eccentric 372 on shaft 640 is in the same axis relative to the axis X(1) of shaft 640.

The rocking member 628 connects to the crankshaft 620 via connecting rod 624. For this, one end of rod 624 also is pivotable on pin 648, while its other end is journalled on crankpin 654 of crankshaft 620. Thus the linear motion of pistons 614 and 614*a* is transferred to the crankshaft 620 via connecting rod 622 and via con rod 622*a* and links 630*a*, respectively, to and to cause oscillating movement of rocking member 628 on adjusting shaft 640 and, from member 628 via connecting rod 624.

In a preferred arrangement, adjusting shaft 640 is located at a suitable position along a vertical centerline between the two banks of cylinders 616 and 616*a* to provide the desired variable stroke characteristics. For the minimum displacement position, the eccentric 372 of adjusting shaft 640 is rotated to the uppermost vertical position, as shown in FIG. 33, and held in position by an hydraulic or mechanical rotary actuator (not shown) mounted on the crankcase 618. The selected rotary actuator needs to have an 180 degree rotary movement and to be controlled by an electronic engine management system using relevant sensors (not shown).

FIG. 28 represents the engine 610 in the minimum displacement position but with the crankshaft 620 rotated through 180 degrees. It is to be noted that regardless of the angle between the two banks of cylinders 616 and 616*a* of such a V-type configuration, the respective pistons 614 and 614*a* are always phased at 180 degrees from one another. Only one second connecting rod 624 is required for each pair of pistons 614 and 614*a* and the axial offset of each pair of cylinders 616 and 616*a*, allows the connecting rod 624 to share the common pin 648 and also to allow the crankshaft 620 to be closely coupled for a compact engine arrangement.

FIGS. 29 and 30 represent the engine 610 at the maximum displacement position with each of the pistons 616 and 616*a* respectively at their top dead centre and bottom dead centre positions in turn, after an 180 degree rotation of the crankshaft 620. This condition is achieved by rotating the adjusting shaft 640 through an angle of 180 degrees, by the rotary actuator (not shown), to the lowermost point of its travel, as shown in FIG. 34.

The stroke of the eccentric 372 of adjusting shaft 640 together with the geometries of all the linkages comprising con rods 622 and 622*a* and links 630 and 630*a* determine the minimum and maximum stroke of the engine 610 and the desired compression ratio at the two extremes. However, additional adjustment of the compression ratio can be achieved by changing the rotational position of the rocking member 628 via an additional eccentric on the adjusting shaft 640.

FIGS. 35 to 37 illustrate an engine 710 according to an eighth embodiment of the present invention which incorporates a rocking mechanism 712 according to the invention. Many components of the engine of FIGS. 35 to 37 are similar to those of engine 610 of FIGS. 27 to 34 and, where this is the case, the same reference numeral plus 100 is used. Also, as functioning of engine 710 generally will be understood from the description in relation to FIGS. 27 to 34, the description of engine 710 will be limited to principal features by which it differs from engine 610.

An in-line configuration IC engine enabling an Atkinson Cycle motion is illustrated earlier herein by engine 410 of FIGS. 16 to 20. Engine 710 of FIGS. 35 to 37 illustrates a V-type engine configuration also enabling an Atkinson Cycle motion. As with engine 410, engine 710 enables fuel economy improvements addition to that available by use of that motion, by allowing the compression ratio to be varied during operation and thus allowing use of a turbocharger or supercharger for optimum performance and economy.

As shown in FIGS. 35 and 36, engine 710 has cylinders 716 and 716*a* in respective multi-cylinder banks of a V-type configuration. While the cylinder block is only partially shown, it and the crankcase (not shown) may be similar to other embodiments herein. The cylinders 716 and 716*a* are closed at one end by cylinder heads (not shown), which are provided with the usual inlet and exhaust port, valves, actuating gear and ignition device.

Each piston assembly 714 moves in its cylinder 716 and connects to the rocking member 728 via connecting rod 722 and a pair of parallel links 730. Connecting rod 722 is pivotally connected at one end to the piston 714 via gudgeon pin 726, and pivotally connected at its other end to one end of the links 730 via pin 750. The other end of the links 730 is pivotally linked to the rocking member 728 by pin 748 fixed on either side of the rocking member 728. The axes X(2) and X(3) of pins 748 and 750 and the axis of gudgeon pin 726 are parallel to each other. Rocking member 728 is pivotally supported at two places on rotating control shaft 740 in a selected geometric position longitudinal along the engine block (not shown), and parallel to the engine crankshaft 720 and each of the pins 726, 748 and 750. Control shaft 740 is rotatable on bearings (not shown) within engine block webs separating the cylinders 716 and 716*a* of each bank. Control shaft 750 has a first eccentric 472 on which the big end of connecting rod 473 is rotatably mounted, with the other end of rod 473 connected to links 730 via pin 474. (Pins 474 and 750 can be co-incident).

Similarly, each piston assembly 714*a* moves in bore 716*a* and connects to the rocking member 728 via connecting rod 722*a* and a pair of parallel links 730*a*. Connecting rod 722*a* is pivotally connected at one end to the piston 714*a* via gudgeon pin 726*a*, and is pivotally connected at the other end to the links 730*a* via pin 750*a*. The other end of the links 730*a* is pivotally linked to the rocking member 728 by common pin 748 fixed on either side of the rocking member 728. The axes X(5) and X(6) of pins 748 and 750*a* and the axis of pin 726*a* are parallel to each other. Rocking member 728 is journalised on control shaft 740 and provides a strong connection to the crankshaft 720 via pin 748 and connecting rod 724. Connecting rod 473*a* is rotationally connected to control shaft 740 on a second eccentric 472*a* (see FIG. 36) and connected to links 730*a* via pin 474*a*.

The two banks of cylinders in the multi-cylinder engine 710 represented by cylinders 716 and 716*a* are displaced (or offset) from each other to allow parallel assembly of the two links 730 and 730*a* on a common pin 748.

The rocking member 728 connects to the crankshaft 720 via connecting rod 724. One end of con rod 724 is pivotable on pin 748, while the other end is journalled on crankpin 754. Thus the linear motion of pistons 714 and 714*a* is transferred to the crankshaft 720 via connecting rods 722 and 722*a*, links 730 and 730*a*, rocking member 728 oscillatable on control shaft 740 with eccentrics 472 and 472*a*, connecting rods 473 and 473*a*, and connecting rod 724.

For a multi-cylinder V-type Atkinson cycle engine, each pair of eccentrics 472 and 472*a* follow the same angular offset of the crankpin 754 on crankshaft 720.

Control shaft 740 is located at a suitable position along a vertical centerline between the two cylinders 716 and 716*a* and is driven at half the speed of crankshaft 720 by a suitable geared, chain or belt drive (not shown), preferably in the same rotational direction as crankshaft 720. Eccentric 472*a* of control shaft 740 is set at 90 degrees trailing eccentric 472 (see FIGS. 36 and 37), if the rotation of control shaft 740 is in the same direction as the crankshaft 720. Control shaft 740 has the added function of concentrically supporting the oscillating rocking member 728.

By introducing variable timing between the control shaft 740 and crankshaft 720 (in a similar manner to a variable valve timing mechanism in conventional engines) the characteristics of the Atkinson Cycle can be altered as desired, as well as having the ability to alter the compression ratio, further improving the efficiency of the engine.

FIGS. 38 to 42 illustrate a rocking mechanism 812 according to a ninth embodiment of the present invention. This utilises an alternative form of hydraulic actuation while mechanism 812 is illustrated in an arrangement for a V-type engine configuration. The arrangement is such that of the respective piston of each bank with which the mechanism is able to be used, the stroke of one piston can be varied while the other piston has a fixed stroke. However, the arrangement readily can be adapted for an engine having an in-line cylinder configuration.

With further reference to FIGS. 38 to 42, the rocking mechanism 812 is shown with three con rods 822, 822*a* and 824 connected to it. The con rod 822 is connectable at its free end to a piston, for one bank of cylinders of an engine of V-type or parallel type configuration, which is to have a piston de-activated. The con rod 822*a* is connectable at its free end to a piston, for the other bank of cylinders, which is to have a fixed stroke. The con rod 824 is connectable at its free end to a crankpin of the crankshaft of the engine.

The rocking mechanism 812 has a rocking member 828 comprising a pair of plate members 828*a* and 828*b* which are retained in parallel spaced relationship on pins 848 and 850*a*, and on actuator shaft 840 shown more fully in FIG. 42. The plate member 828*a* has a trunnion sleeve extension 87 in which one end 840*a* of shaft 840 is journalled, while sleeve extension itself is journalled in a bore of a web (not shown) of the engine crankcase. The other plate member 828*b* is journalled on the other end 840*b* of shaft 840. Also, end 840*b* projects beyond plate member 828*b* and is journalled in a bore of a further crankcase web (also not shown). Thus, rocking member 828 is able to oscillate on the axis of shaft 840, while shaft 840 also is able to rotate on that axis.

The mechanism 812 further includes a parallel pair of link members 830. At one end thereof, members 830 are pivotable on pin 848, between plate members 828*a* and 828*b*, while the other ends of members 830 are pivotably coupled by pin 850 to the end of con rod 822. Similarly, con rod 822*a* has a bifurcated end by which it is pivotable on two axially in-line pins 850*a*, between members 828*a* and 828*b*. Additionally, the little end of con rod 824 is pivotably coupled to member 828 on pin 848.

As indicated, con rod 822*a* has a bifurcated end by which it is pivotably connected to rocking member 828. Each side of that end is pivotably coupled to a respective one of plate members 828*a* and 828*b* by a respective one of axially inline pins 850*a*. This leaves a gap between those sides and pins 850*a* into which con rod 824 can be received, if this is required, in the course of its movement relative to rocking member 828.

A rotary actuator is defined within trunnion sleeve extension 87, and enables rotation of shaft 840 relative to members 828*a* and 828*b* of rocking member 828. The actuator includes a pressure chamber 88 defined by the inner peripheral surface of extension 87, a cut-away portion of end 840*a* of shaft 840 and a cover 89 for sealing across the end of extension 87. The inner surface of extension 87 has a radial vane 90 which, with relative rotation between member 828 and shaft 840, sweeps arcuately around chamber 88. The cut-away portion of shaft end 840*a* is such as to define a radial surface 91 which provides a seal across chamber 88 a short distance inwardly from the inner surface of plate member 828*a*, and a longitudinal surface 92 which is shaped to follow movement of the inner edge of vane 90 around chamber 88. Surface 92 has respective, somewhat radial end portions 92*a* and 92*b* and a central, arcuate portion 92*c* between those end portions. Relative movement between shaft 840 and rocking member 828 is arrested when a side face of vane 90 abuts a respective one of end portions 92*a* and 92*b*, as shown respectively in FIGS. 38 and 39.

Vane 90 provides a seal between a respective one of its longitudinal end faces and each of surface 91 and the inner face of cover 89, while the radial inner edge of vane 90 provides a seal with surface portion 92*c*. The arrangement is such that surfaces 92*a* and 92*b* move between the faces of vane 90 between the positions shown in FIGS. 38 and 39. For that movement, shaft 840 is biased from the position shown in FIG. 38 to the position shown in FIG. 39 by shaft 840 rotating in an anti-clockwise direction relative to member 828 under the action of a suitable spring (not shown). The shaft 840 is movable in the opposite direction by oil under pressure being supplied to chamber 88, and can return under the action of the spring on release of oil pressure. For this, the oil is supplied to central inlet 89*a* of cover 89, and then along passage 89*b* to an outlet 89*c*. With shaft 840 in the position in FIG. 39, the outlet 89*c* communicates with groove 92*d* in end surface portion 92*b*, to enable application of pressure for moving the shaft 840 around chamber 88 against the bias of the spring. A number of convenient spring arrangements are possible. For example, the spring may act between one of plate members 828*a* and 828*b* and either the links 830 or a pin 93*b* referred to later herein.

O-ring seals (not shown) are provided between the end of extension 87 and cover 89 and, within extension 87, around shaft 840 just beyond surface 91 from surface 92. Also, as indicated, seals are provided between respective edges of vane 90 and each of cover 89, surface 91 and surface portion 92*c*.

Rotation of shaft 840 relative to rocking member 828 is to enable pivoting of link members 830 relative to member 828 and, of course, is distinguished from rocking movement of member 828. The two motions can occur simultaneously but, where this is not the case, rocking movement of member 828 on the axis of shaft 840 is with corresponding oscillating rotation of shaft 840 with movement of member 828.

To pivot link members 830 relative to member 828, with rotation of shaft 840 relative to member 828, a link 93 is provided between shaft 840 and members 830. As is evident from FIGS. 40 to 42, shaft 840 has a central region which defines an internal cavity 94 opening laterally in the direction surface 92 faces. Also, to one side of cavity 94, shaft 840 has a longitudinally spaced pair of lugs 95 defining openings 95*a* which are axially in line and parallel to the axis of shaft 840. One end of link 93 is pivotable on a pin 93*a* held captive in openings 95*a*, while the other end of link 93 is pivotable on pin 93*b* journalled in each of link members 830, intermediate respective pins 848 and 850.

FIG. 41 shows shaft 840 as having moved anti-clockwise relative to member 828, in the orientation illustrated, from the relative positions shown in FIG. 40. This is as a consequence of the release of oil pressure in chamber 88 and the action of the return spring. In the relative positions shown in FIGS. 38 and 40, link members 830 are held in a position providing a maximum stroke for a piston mounted on con rod 822 by maintenance of oil pressure in chamber 88. In the relative positions shown in FIGS. 39 and 41, achieved by the return action of a spring on releasing the oil pressure, the stroke of a piston on con rod 822 is reduced. Indeed, as FIG. 41 shows the axis X(3) of pin 850 is co-incident with the axis X(1) of shaft 840, the piston will have zero stroke length in the relative positions shown in FIGS. 39 and 41 and, hence, it will be de-activated. The piston can be re-activated by supply of oil pressure to chamber 88 to rotate shaft 840 relative to member 848, against the action of the spring, to move from the position shown in FIGS. 39 and 41 to the position shown in FIGS. 38 and 40. As seen in FIG. 41, the cavity 94 accommodates the link 93 and the end of link members 830 when the arrangement is in the piston de-activated position.

As will be evident, the stroke of a piston mounted on con rod 822*a* remains unchanged despite rotation of shaft 840 relative to member 828.

The tenth embodiment of a rocking mechanism 912 of FIGS. 43 and 44 readily will be understood from previous description. It therefore will be described principally in terms of features by which it differs from previous embodiments. However, as with mechanism 812 of FIGS. 38 to 42, mechanism 912 is for de-activating and re-activating a piston 914 mounted on con rod 922 by gudgeon pin 926. The piston 914 is shown in relation to a cylinder 916 in which it is moveable, although cylinder 916 is partly broken away while neither other parts of the cylinder block nor the crankcase are shown. Also, the mechanism is for transferring linear reciprocation motion of piston 914 to crankshaft 920, for rotating the latter. To enable this, a further con rod 924 has its little end pivotably connected to member 928 by pin 952 and its big end journalled on crankpin 954 of crankshaft 920.

The mechanism 912 has a rocking member 928 which comprises a parallel pair of plates 928*a* and 928*b* which are joined by a cross-member 938. Each plate 928*a* and 928*b* is journalled on a respective one of axially in-line trunnion pins 940 so that member 928 is able to rock or oscillate on the axis X(1) of pins 940. A link member 930 is disposed between plates 928*a* and 928*b* and is secured at one end to a pin 948 offset from axis X(1) and journalled in member 928. Link member 930 is pivotable relative to member 928 by rotation of pin 948 on its axis X(2). The other end of member 930 is pivotably coupled, to the end of con rod 922 remote from piston 914, by pin 950 having an axis X(3) parallel to axes X(1) and X(2). In line with all other embodiments herein, these axes are parallel to the axis X(4) of pin 952, as well as the axis X of crankshaft 920 and the axis of gudgeon pin 926. The sectional view of FIG. 44 is on a plane containing each of axes X(1) and X(2).

Holding device is integrated within rocking member 928. This includes a chamber 96 defined in the outer face of plate 928*a* and a cover (not shown). As seen in FIG. 43, the chamber 96 has the shape substantially corresponding to that of a sector of a circle normal to and centered on axis X(2). The end of pin 948 is rotatable in the apex of the sector shape and has a radial vane 97 which, with rotation of pin 948 relative to member 928, sweeps around the arc of the sector shape, between the radial sides 96*a* and 96*b* of chamber 96.

The vane 97 is provided with respective radial seals (not shown) for sealing against the cover for the chamber 96, and against the opposite face defined by plate 928*a*, and a seal (not shown) across its end for sealing at the arc of the sector shape of chamber 96. The vane 97 is able to be moved to the extreme position against side 96*a* as shown in each of FIGS. 43 and 44 by oil supplied under pressure to the chamber 96. On release of oil pressure, the bias applied by a spring causes the vane to sweep around the chamber to the other extreme position against side 96*b*.

As shown in FIG. 44, oil under pressure is supplied to the trunnion pin 940 for plate 928*a* along a radial and axial passage 98, from which it passes through respective ceramic buttons 99*a* and 99*b* in the pin 940 and plate 928*a*, respectively, for flow along a passage 98*a* in plate 928*a* which ends at a groove 96*c* formed defined in the nearer radial side 96*b* of the sector shape of chamber 96. The spring 100 for moving vane from the position illustrated in FIGS. 43 and 44 to the other extreme position in the chamber is a torsion spring which extends axially within pin 948. One end of the spring 100 is fixed in the end of pin 948 from which the vane 97 extends. The other end of the spring 100 is held captive in a fitting 101 secured to the outer face of plate 928b.

When oil pressure in the chamber is sufficient to move the vane 97 to the position illustrated, the connection at pin 950 is held at a position in which piston 914 has a maximum stroke. On release of oil pressure, the spring 100 returns the vane 97 to the other extreme position against side 96b, with corresponding pivoting of link member 930 and the connection at pin 950. On attaining that other extreme position, pin 950 is co-axial with trunnion pins 940, such that piston 914 is de-activated. Re-application of oil pressure to chamber 96 then is necessary to re-activate piston 914.

FIG. 45 is a perspective view of an IC engine having four cylinders in an in-line configuration. In addition to showing the four cylinders cut-away, the cylinder block and engine casing has been omitted for ease of illustration. The engine is based on the embodiment of FIGS. 11 to 15 and the same reference numerals therefore are used, but followed by the letter "a".

Engine 310a has crankshaft 320a offset to one side of the in-line pistons 314a and cylinders 316a. The crankshaft 320a is rotatable in main bearings 102,103 in response to linear motion of the pistons by the action of the con rods 322a and 324a and rocking mechanism 312a for each piston 314a.

Common to each rocking mechanism 312a, there is an adjusting shaft 340a. Rotation of shaft 340a adjusts each rocking mechanism 312a, in the manner described in relation to engine 300 of FIGS. 11 to 15, to enable simultaneous and the same variation of the stroke of each piston 314a. As shown, adjusting shaft 340a is rotatable by a mechanism 104 for this purpose. The mechanism 104 includes a housing 105 which defines a chamber 106 in which a radial vane 107 from shaft 340a moves to rotate shaft 340a. The chamber 106 is shown open, but is covered by a plate of housing 105. Oil under pressure is able to be supplied to chamber 106, to one or the other side of vane 107, through respective inlet conduit 108a and 108b. The vane 107 is sealed and movable in the same manner as vane 97 of FIGS. 43 and 44, except that oil pressure from a respective one or other of conduits 108a and 108b is used for movement in each direction, rather than using a spring bias for movement in one direction.

FIG. 46 illustrate an eleventh embodiment of the present invention which incorporates a rocking mechanism 1012 according to the invention. Many components of the engine of FIG. 46 are similar to those of engine 310 of FIGS. 11 to 15 and, where this is the case, the same reference numeral plus 30 700 is used. Also, as functioning of the rocking mechanism 1012 generally will be understood from the description in relation to FIGS. 11 to 15, the description of rocking mechanism 1012 will be limited to principal features by which it differs.

A piston assembly 1014 moves in cylinder 1016 and connects to a parallel pair of rocking members 1028, only one of which is shown for clarity, via connecting rod 1022 and forked link 1030. Connecting rod 1022 is pivotally connected to the piston 1014 via gudgeon pin 1026, and pivotally connected to the forked link 1030 via pin 1050. The other end of the forked link 1030 is pivotally linked to the rocking member 1028 by pin 1048 journalled on either side of the pair of rocking members 1028. Integral with connecting rod 1022, a pair of radially extended lugs 109 extend radially from the axis X(3) of pin 1050 towards adjusting shaft 1040. One end of connecting rod 1073 is pivotable on pin 1074 journalled in each of lugs 109 of connecting rod 1022. The axes of pins X(2) and X(3) of pins 1048, 1050 and 1074 and of gudgeon pin 1026 are parallel to each other.

Referring to FIG. 46, adjusting shaft 1040 has eccentric 1072 rotatably connected to connecting rod 1073 linked to connecting rod 1022 via pin 1074 and lugs 109 and is positioned in a selected geometric position parallel to the engine crankshaft 1020 and all of the pins 1026,1048 and 1050.

The rocking member 1028 connects to the crankshaft 1020 via connecting rod 1024. One end of con rod 1024 is pivotable on pin 1052 mounted on rocking member 1028, while the other end is journalled on crankpin 1054. The position of pin 1052 can be placed in a suitable radial position on the rocking member 1028 or, alternatively, the one end of rod 1024 can be pivotable on pin 1048, to transmit the oscillating motion of rocking member 1028 to the crankshaft 1020.

Thus the linear motion of piston 1014 is transferred to the crankshaft 1020 via connecting rod 1022, forked link 1030, rocking member 1028 and connecting rod 1024, controlled by connecting rod 1073 linked to connecting rod 1022 via lugs 109 and oscillating on adjusting shaft 1040.

The principal difference in this embodiment is the holding device comprising of connecting rod 1074 linked directly to lug 109 of connecting rod 1022. The holding device described in this embodiment can be applied to embodiments referred in FIGS. 13, 16, 21, 27 and 35.

The scope of the invention need not be limited to the mechanisms shown, variations in the positioning of the crankshaft, the rocking member and linkage geometries to achieve the same outcome, fall within this invention.

The invention claimed is:

1. A rocking mechanism through which linear reciprocating movement of a piston of an internal combustion engine can be transferred, from the remote end of a con rod on which the piston is mounted, to a crankshaft;

wherein the rocking mechanism includes:

a rocking member;

mountings by which the rocking member is mountable, on a structure of or secured to a crankcase for the engine, for reversible rocking movement on a first axis;

a link member pivotally connected, at one of opposite ends thereof, to the rocking member so as to be pivotable relative to the rocking member on a second axis, offset from and parallel to the first axis, between two extreme positions; and a holding device by which the link member is releasably holdable in either of the two extreme positions; and wherein at its other end, the link member is adapted for pivotably connecting to the remote end of con rod so as to be pivotable relative to the con rod on a third axis which is offset from the second axis and parallel to the first and second axes and, at a location offset from the first axis, the rocking member is adapted for pivotally connecting to a little end of a further con rod, having a big end connectable to the crankshaft, for relative rotation between the rocking member and the further con rod on a fourth axis parallel to the first, second and third axes.

2. The rocking mechanism of claim 1, wherein the rocking member has at least one plate member with the first and second axes extending normal to and through the at least one plate member.

3. The rocking mechanism of claim 1, wherein the rocking member has at least two mutually spaced, substantially parallel plate members with the first and second axes extending normal to and through each of the plate members.

4. The rocking mechanism of claim 1, wherein the mountings comprise a pair of axle members or trunnion pins each integral with and extending oppositely from the rocking member and each with an axis on the first axis.

5. The rocking mechanism of claim 1, wherein the mountings comprise openings defined by the rocking member or by fittings secured to the rocking member, by which the rocking member is adapted to receive an axle or a shaft or a respective axle or shaft extending from an adjacent structure of, or secured to, the engine crankcase.

6. The rocking mechanism of claim 1, wherein the mountings include an axle or shaft extending through the rocking member and adapted to extend through a further rocking member of a further adjacent rocking mechanism.

7. The rocking mechanism of claim 1, wherein the link member is of elongate form and adapted for pivotable coupling at each end, and wherein the link member comprises a single elongate bar or a parallel pair of laterally spaced elongate bars.

8. The rocking mechanism of claim 7, wherein the link member is forked in comprising a parallel pair of elongate arms, joined at an end of each arm at which the link member is connectable to the rocking member at the second axis, and wherein the arms are joined at said end of each by a cylindrical web or boss by which the link member is able to be connected to the rocking member by a pin extending through each of the web or boss and the rocking member.

9. The rocking mechanism of claim 1, wherein the holding device is operable to hold the link member at a selected one of two extreme positions between which the link member is pivotable relative to the rocking member.

10. The rocking mechanism of claim 1, wherein the holding device is operable to hold the link member at any required position at one of or intermediate two extreme positions between which the link member is pivotable relative to the rocking member.

11. The rocking mechanism of claim 1, wherein the holding device is operable by a mechanical and/or a hydraulic device.

12. The rocking mechanism of claim 1, wherein the mountings comprise an opening defined by the rocking member or by a fitting secured to the rocking member; and wherein the holding device includes an adjusting shaft or axle having an axis co-incident with the first axis on which it is rotatable relative to the rocking member, an eccentric rotatable with the adjusting shaft or axle to orbit around the first axis and a holding arm which is journalled at one end on the eccentric and extends therefrom radially with respect to the first axis to a pivotable coupling between its other end and the link member, whereby the holding arm is moved with orbiting of the eccentric in response to rotation of the adjusting shaft or axle to pivot the link member on the second axis relative to the rocking member.

13. The rocking mechanism of claim 12, wherein the adjusting shaft or axle forms part of an hydraulic actuator which includes a housing into which the adjusting shaft or axle extends, the actuator further including a vane which extends radially from the adjusting shaft or axle within a chamber defined by the housing, with the housing adapted for the supply of hydraulic fluid to the chamber for causing the vane to sweep arcuately in the chamber and thereby rotate the adjusting shaft.

14. The rocking mechanism of claim 12, wherein the housing is adapted for the supply of hydraulic fluid to a selected one of two regions of the chamber for causing the vane to sweep and thereby rotate the adjusting shaft in a required direction, and wherein the hydraulic fluid is able to be supplied to move the vane to and hold the vane in only one of the two extreme positions, against the bias of a spring acting to move the vane to and hold the vane in the other extreme position as hydraulic fluid is released from the chamber.

15. The rocking mechanism of claim 1, wherein the link member is pivotable relative to the rocking member on said second axis by a pin which is journalled in the rocking member and to which the one end of the link member is non-rotatably engaged or secured; the pin forms part of a hydraulic actuator which comprises the holding device, the actuator further including a vane which extends radially from the pin within a chamber defined by or on the rocking member in which the vane is able to sweep arcuately with rotation of the pin, and a mechanism by which hydraulic fluid is able to be supplied to the chamber for moving the vane to and holding the vane in one of two extreme positions.

16. The rocking mechanism of claim 1, wherein the spacing between the first and second axes is the same as the spacing between the second and third axes, and the link member is pivotable on the second axis to a position in which the first and third axes are co-incident.

17. The rocking mechanism of claim 1, wherein the rocking member is adapted for pivotally connecting to the little end of the further con rod on the fourth axis at a location at which the second and fourth axes are co-incident.

18. The rocking mechanism of claim 1, wherein the mountings comprise an opening defined by the rocking member or by a fitting secured to the rocking member; and wherein the holding device includes an adjusting shaft or axle having an axis co-incident with the first axis on which it is rotatable relative to the rocking member, an eccentric rotatable with the adjusting shaft or axle to orbit around the first axis and a holding arm which is journalled at one end on the eccentric and extends therefrom radially with respect to the first axis to a pivotable coupling between its other end and a lug extending from the remote end of the first con rod offset and parallel to the third axis.

19. An internal combustion (IC) engine having a cylinder head and a crankcase, a plurality of cylinders defined by the cylinder head, a crankshaft journalled in the crankcase for rotation on a longitudinal axis of rotation, a respective piston in each cylinder, and a respective con rod on one end of which each piston is mounted and from the remote end of which each piston is connected to the crankshaft for transferring linear reciprocation movement of each piston in its cylinder to, and for rotating, the crankshaft; the engine further includes, for at least one cylinder, a rocking mechanism through which the con rod (hereinafter referred to as the "first con rod"), on which the piston of the one cylinder is mounted, is connected to the crankshaft; wherein the rocking mechanism includes:

a rocking member;
mountings by which the rocking member is mounted, on
    a structure of or secured to a crankcase for the engine,
    for reversible rocking movement on a first axis parallel
    to the crankshaft axis;

a link member pivotally connected, at one of opposite ends thereof, to the rocking member so as to be pivotable relative to the rocking member on a second axis, offset from and parallel to the first axis, between two extreme positions; and a holding device by which the link member is releasably holdable in either of the two extreme positions;

wherein the other end of the link member is pivotally connected to the remote end of the first con rod so as to be pivotable relative to the first con rod on a third axis offset from and parallel to the first and second axes; the rocking member is pivotally connected to a little end of a second con rod having a big end journalled on the crankshaft, for relative rotation between the rocking member and the second con rod on a fourth axis parallel to the first, second and third axes; the first and second con rods are movable in the same plane or parallel planes and the first, second, third and fourth axes are parallel to the axis of rotation of the crankshaft; and wherein the arrangement is such that, with the holding device holding the link member, linear reciprocating motion of the piston of the one cylinder is able to be transferred to the crankshaft and rotate the crankshaft, by the resultant motion of the first con rod being transferred to the second con rod by rocking motion of the rocking member on the first axis, by pivoting of the link member relative to the first con rod on the third axis, and by pivoting of the rocking member relative to the second con rod on the fourth axis.

20. The IC engine of claim 19, wherein the mountings comprise an opening defined by the rocking member or by a fitting secured to the rocking member; and wherein the holding device includes an adjusting shaft or axle having an axis co-incident with the first axis on which it is rotatable relative to the rocking member, an eccentric rotatable with the adjusting shaft or axle to orbit around the first axis and a holding arm which is journalled at one end on the eccentric and extends therefrom radially with respect to the first axis to a pivotable coupling between its other end and the link member, whereby the holding arm is moved with orbiting of the eccentric in response to rotation of the adjusting shaft or axle to pivot the link member on the second axis relative to the rocking member.

21. An internal combustion (IC) engine having a cylinder head and a crankcase, a plurality of cylinders defined by the cylinder head in an in-line configuration, a crankshaft journalled in the crankcase for rotation on a longitudinal axis of rotation, a respective piston in each cylinder, and a respective con rod on one end of which each piston is mounted and from the remote end of which each piston is connected to the crankshaft for transferring linear reciprocation movement of each piston in its cylinder to, and for rotating, the crankshaft; the engine further includes, for each of at least two cylinders, a respective rocking mechanism through which the con rod (hereinafter referred to as the "first con rod"), on which the piston of each of the at least two cylinders is mounted, is connected to the crankshaft; wherein the rocking mechanism includes:

a rocking member;

mountings by which the rocking member is mounted, on a structure of or secured to a crankcase for the engine, for reversible rocking movement on a first axis parallel to the crankshaft axis;

a link member pivotally connected, at one of opposite ends thereof, to the rocking member so as to be pivotable relative to the rocking member on a second axis, offset from and parallel to the first axis, between two extreme positions; and a holding device by which the link member is releasably holdable in either of the two extreme positions;

wherein the other end of the link member is pivotally connected to the remote end of the first con rod so as to be pivotable relative to the first con rod on a third axis offset from and parallel to the first and second axes; the rocking member is pivotally connected to a little end of a second con rod having a big end journalled on the crankshaft, for relative rotation between the rocking member and the second con rod on a fourth axis parallel to the first, second and third axes; the first and second con rods are movable in the same plane or parallel planes and the first, second, third and fourth axes are parallel to the axis of rotation of the crankshaft; and wherein the arrangement is such that, with the holding device holding the link member, linear reciprocating motion of the piston of the one cylinder is able to be transferred to the crankshaft and rotate the crankshaft, by the resultant motion of the first con rod being transferred to the second con rod by rocking motion of the rocking member on the first axis, by pivoting of the link member relative to the first con rod on the third axis, and by pivoting of the rocking member relative to the second con rod on the fourth axis; and wherein the holding device for each of the at least two cylinders is operable to pivot the link member to bring its fourth axis into coincidence with the first axis and thereby enable its piston to be de-activated.

22. An internal combustion (IC) engine having a cylinder head and a crankcase, a plurality of cylinders defined by the cylinder head in an in-line configuration, a crankshaft journalled in the crankcase for rotation on a longitudinal axis of rotation, a respective piston in each cylinder, and a respective con rod on one end of which each piston is mounted and from the remote end of which each piston is connected to the crankshaft for transferring linear reciprocation movement of each piston in its cylinder to, and for rotating, the crankshaft; the engine further includes, for each cylinder, a respective rocking mechanism through which the con rod (hereinafter referred to as the "first con rod"), on which the piston of each cylinder is mounted, is connected to the crankshaft: wherein each rocking mechanism includes:

a rocking member;

mountings by which the rocking member is mounted, on a structure of or secured to a crankcase for the engine, for reversible rocking movement on a first axis parallel to the crankshaft axis;

a link member pivotally connected, at one of opposite ends thereof, to the rocking member so as to be pivotable relative to the rocking member on a second axis, offset from and parallel to the first axis, between two extreme positions; and a holding device by which the link member is releasably holdable in either of the two extreme positions;

wherein the other end of the link member is pivotally connected to the remote end of the first con rod so as to be pivotable relative to the first con rod on a third axis offset from and parallel to the first and second axes; the rocking member is pivotally connected to a little end of a second con rod having a big end journalled on the crankshaft, for relative rotation between the rocking member and the second con rod on a fourth axis parallel to the first, second and third axes; the first and second con rods are movable in the same plane or parallel planes and the first, second, third and fourth axes are parallel to the axis of rotation of the crankshaft; and wherein the arrangement is such that, with the holding device holding the link member, linear reciprocating motion of the piston of the one cylinder is able to be transferred to the crankshaft and rotate the crankshaft, by the resultant motion of the first con rod being transferred to the second con rod by rocking motion of the rocking member on the first axis, by pivoting of the link member relative to the first con rod on the third axis, and by pivoting of the rocking member relative to the second con rod on the fourth axis; and wherein the holding device for each rocking mechanism is operable in unison with each other holding device to vary the stroke of each piston between two extreme settings.

23. An internal combustion (IC) engine having a cylinder head and a crankcase, a plurality of cylinders defined by the crankcase cylinder head in an in-line configuration, a crankshaft journalled in the crankcase for rotation on a longitudinal axis of rotation, a respective piston in each cylinder, and a respective con rod on one end of which each piston is mounted and from the remote end of which each piston is connected to the crankshaft for transferring linear reciprocation movement of each piston in its cylinder to, and for rotating, the crankshaft; the engine further includes, for each cylinder, a respective rocking mechanism through which the con rod (hereinafter referred to as the "first con rod"), on which the piston of each cylinder is mounted, is connected to the crankshaft; wherein each rocking mechanism includes:
  a rocking member;
  mountings by which the rocking member is mounted, on a structure of or secured to a crankcase for the engine, for reversible rocking movement on a first axis parallel to the crankshaft axis;
  a link member pivotally connected, at one of opposite ends thereof, to the rocking member so as to be pivotable relative to the rocking member on a second axis, offset from and parallel to the first axis, between two extreme positions; and
  a holding device by which the link member is releasably holdable in either of the two extreme positions;
wherein the other end of the link member is pivotally connected to the remote end of the first con rod so as to be pivotable relative to the first con rod on a third axis offset from and parallel to the first and second axes; the rocking member is pivotally connected to a little end of a second con rod having a big end journalled on the crankshaft, for relative rotation between the rocking member and the second con rod on a fourth axis parallel to the first, second and third axes; the first and second con rods are movable in the same plane or parallel planes and the first, second, third and fourth axes are parallel to the axis of rotation of the crankshaft; and wherein the arrangement is such that, with the holding device holding the link member, linear reciprocating motion of the piston of the one cylinder is able to be transferred to the crankshaft and rotate the crankshaft, by the resultant motion of the first con rod being transferred to the second con rod by rocking motion of the rocking member on the first axis, by pivoting of the link member relative to the first con rod on the third axis, and by pivoting of the rocking member relative to the second con rod on the fourth axis; wherein the mountings comprise an opening defined by the rocking member or by a fitting secured to the rocking member; and wherein the holding device includes an adjusting shaft or axle having an axis co-incident with the first axis on which it is rotatable relative to the rocking member, an eccentric rotatable with the adjusting shaft or axle to orbit around the first axis and a holding arm which is journalled at one end on the eccentric and extends therefrom radially with respect to the first axis to a pivotable coupling between its other end and the link member, whereby the holding arm is moved with orbiting of the eccentric in response to rotation of the adjusting shaft or axle to pivot the link member on the second axis relative to the rocking member; and wherein the engine includes device drivingly connecting the adjusting shaft and the crankshaft to provide a fixed rotational ratio of one to two respectively, whereby said engine is operable with an Atkinson Cycle motion.

24. The engine of any one of claims 21 to 23, wherein the plurality of cylinders are in-line in a first bank of a V-type configuration, with the engine including a further plurality of cylinders in-line in a second bank.

* * * * *

UNITED STATES PATENT AND TRADEMARK OFFICE
CERTIFICATE OF CORRECTION

PATENT NO.       : 7,174,863 B2
APPLICATION NO.  : 10/541223
DATED            : February 13, 2007
INVENTOR(S)      : Joseph Scalzo It is certified that error appears in the above-identified patent and that said Letters Patent is hereby corrected as shown below:

In Column 1, line 9:

replace "(FILL IN OTHERS)" with

Australian Patent Application No. 2003900267 filed Jan. 22, 2003,
Australian Patent Application No. 2003900349 filed Jan. 28, 2003,
Australian Patent Application No. 2003903018 filed Jun. 16, 2003,
Australian Patent Application No. 2003904582 filed Aug. 25, 2003,
Australian Patent Application No. 2003906039 filed Nov. 3, 2003,
International Application No. PCT/AU2003/001725 filed Dec. 24, 2003, In Column 2, line 61:

delete "25"

In Column 3, line 31:

delete "20"

In Column 3, line 39:

delete "25"

In Column 3, line 64:

delete "10"

In Column 4, line 10:

delete "20"

In Column 4, line 62:

delete "25"

UNITED STATES PATENT AND TRADEMARK OFFICE
CERTIFICATE OF CORRECTION

PATENT NO. : 7,174,863 B2
APPLICATION NO. : 10/541223
DATED : February 13, 2007
INVENTOR(S) : Joseph Scalzo It is certified that error appears in the above-identified patent and that said Letters Patent is hereby corrected as shown below:

In Column 5, line 14:

delete "5"

In Column 5, line 21:

delete "10"

In Column 9, line 12:

delete "5"

In Column 11, line 12:

delete "6" and insert "θ"

In Column 18, line 2:

delete "'B1" and insert "'B"

In Column 18, line 11:

delete "'A1" and insert "'A"

Signed and Sealed this

Seventeenth Day of November, 2009

David J. Kappos
*Director of the United States Patent and Trademark Office*